United States Patent
Saito et al.

(10) Patent No.: US 10,948,917 B2
(45) Date of Patent: Mar. 16, 2021

(54) MOBILE MANIPULATOR, METHOD FOR CONTROLLING MOBILE MANIPULATOR, AND PROGRAM THEREFOR

(71) Applicant: OMRON Corporation, Kyoto (JP)

(72) Inventors: Chisato Saito, Tokyo (JP); Toshihiro Moriya, Tokyo (JP)

(73) Assignee: OMRON Corporation, Kyoto (JP)

(*) Notice: Subject to any disclaimer, the term of this patent is extended or adjusted under 35 U.S.C. 154(b) by 185 days.

(21) Appl. No.: 16/134,464

(22) Filed: Sep. 18, 2018

(65) Prior Publication Data

US 2019/0138009 A1 May 9, 2019

(30) Foreign Application Priority Data

Nov. 8, 2017 (JP) .............................. JP2017-215398

(51) Int. Cl.
*G05D 1/02* (2020.01)
*B25J 9/16* (2006.01)
(Continued)

(52) U.S. Cl.
CPC ............ *G05D 1/0214* (2013.01); *B25J 5/007* (2013.01); *B25J 9/162* (2013.01); *B25J 9/1697* (2013.01);
(Continued)

(58) Field of Classification Search
CPC . B25J 5/007; B25J 9/162; G05B 2219/40298; G05B 2219/40323; G05B 2219/37337; G05B 2219/37351; G05B 2219/37434; G05B 2219/39195; G05B 2219/39241; G05D 1/0044; G05D 1/0094;
(Continued)

(56) References Cited

U.S. PATENT DOCUMENTS 8,452,449 B2   5/2013  Iida
9,892,744 B1 *  2/2018  Salonidis ................ G10L 25/51
(Continued)

FOREIGN PATENT DOCUMENTS

DE       293163 A1 *  9/1986
JP    06114762 A  *  4/1994
(Continued)

OTHER PUBLICATIONS

U.S. Provisional Patent Application 62/579408, filed on Oct. 31, 2017, 43 pp. (Year: 2017).*
(Continued)

*Primary Examiner* — Faris S Almatrahi
*Assistant Examiner* — David A Testardi
(74) *Attorney, Agent, or Firm* — Metrolex IP Law Group, PLLC.

(57) ABSTRACT

A mobile manipulator includes a moving apparatus, a manipulator that is connected to the moving apparatus, a controller configured to control the moving apparatus and the manipulator, and an environment acquisition sensor configured to acquire predetermined environmental data originating from an environment at the movement destination to which the mobile manipulator is moved by the moving apparatus in association with a position at the movement destination, and the controller controls at least one of the moving apparatus and the manipulator based on the environmental data.

18 Claims, 13 Drawing Sheets

(51) Int. Cl.
*G05D 1/00* (2006.01)
*B25J 13/08* (2006.01)
*B25J 19/02* (2006.01)
*B25J 5/00* (2006.01)

(52) U.S. Cl.
CPC ........... *B25J 13/087* (2013.01); *B25J 13/088* (2013.01); *B25J 19/023* (2013.01); *G05D 1/0094* (2013.01); *G05D 1/0223* (2013.01); *G05D 1/0231* (2013.01); *G05D 1/0274* (2013.01); *G05B 2219/39195* (2013.01); *G05B 2219/39199* (2013.01); *G05B 2219/39241* (2013.01); *G05B 2219/40298* (2013.01); *G05B 2219/40323* (2013.01)

(58) Field of Classification Search
CPC .............. G05D 1/0214; G05D 1/0223; G05D 2201/0216; G05D 1/0274; B60W 30/143; B60W 30/146
See application file for complete search history.

(56) References Cited

U.S. PATENT DOCUMENTS

| | | | | |
|---|---|---|---|---|
| 2005/0038562 A1* | 2/2005 | Bash | ................... | G05D 1/0274 700/245 |
| 2006/0061478 A1* | 3/2006 | Kim | ................... | G08B 25/10 340/628 |
| 2006/0138975 A1* | 6/2006 | Lim | ................... | B25J 9/162 318/66 |
| 2007/0061047 A1* | 3/2007 | Sato | ................... | G05D 19/02 700/280 |
| 2010/0135502 A1* | 6/2010 | Keady | ................... | A61B 5/121 381/58 |
| 2010/0282209 A1* | 11/2010 | Gray | ................... | B60K 31/047 123/350 |
| 2011/0251735 A1* | 10/2011 | Hayashi | ............... | G05D 1/0212 701/2 |
| 2012/0065902 A1* | 3/2012 | Nakajima | ................... | G01L 5/161 702/41 |
| 2012/0277912 A1* | 11/2012 | Kirihara | ................. | B25J 9/1694 700/258 |
| 2013/0325325 A1* | 12/2013 | Djugash | ............... | G08G 1/0129 701/425 |
| 2014/0039825 A1* | 2/2014 | Antonini | ................ | G08B 21/12 702/121 |
| 2014/0156070 A1* | 6/2014 | Merry | ................... | B25J 9/1653 700/253 |
| 2014/0192990 A1* | 7/2014 | Cheng | ................... | H04R 29/00 381/56 |
| 2015/0110276 A1* | 4/2015 | Gereb | ................... | G01H 3/125 381/56 |
| 2015/0258993 A1* | 9/2015 | Chakravarty | ......... | B60W 30/20 701/93 |
| 2015/0285644 A1* | 10/2015 | Pfaff | ...................... | G01C 21/34 701/25 |
| 2015/0306767 A1* | 10/2015 | Saito | ........................ | B25J 9/162 700/255 |
| 2016/0016310 A1* | 1/2016 | Zhao | ........................ | G05B 7/00 700/261 |
| 2016/0297429 A1* | 10/2016 | Watts | ..................... | B60K 31/00 |
| 2016/0334798 A1* | 11/2016 | Foster | .................. | G05D 1/0274 |
| 2016/0370802 A1* | 12/2016 | Ueda | ..................... | G05D 1/0214 |
| 2017/0010100 A1* | 1/2017 | Takeuchi | ............. | G05D 1/0276 |
| 2017/0103420 A1* | 4/2017 | Ramasarma | ............ | G01S 19/39 |
| 2017/0261975 A1* | 9/2017 | Liu | ..................... | H04B 10/116 |
| 2017/0312922 A1* | 11/2017 | Unno | .................... | B25J 9/1694 |
| 2017/0372242 A1* | 12/2017 | Alsubai | ............. | G06Q 10/0635 |
| 2018/0002894 A1* | 1/2018 | Yamamoto | ............ | E02F 9/2066 |
| 2019/0015981 A1* | 1/2019 | Yabushita | .............. | B25J 9/1666 |
| 2019/0129425 A1* | 5/2019 | Drexler | .................. | G01C 21/32 |
| 2019/0385583 A1* | 12/2019 | Muggleton | ...... | G10K 11/17881 |

FOREIGN PATENT DOCUMENTS

| | | | | |
|---|---|---|---|---|
| JP | 09058998 A | * | 3/1997 | |
| JP | 2008225837 A | * | 9/2008 | |
| JP | 2010064215 A | * | 3/2010 | |
| JP | 2011224694 A | * | 11/2011 | ........... B60K 31/047 |
| JP | 2014-30857 A | | 2/2014 | |
| JP | 2014-119903 A | | 6/2014 | |
| JP | 2016115218 A | * | 6/2016 | |
| KR | 102016005027 A | * | 5/2016 | |
| WO | WO-2009037715 A1 | * | 3/2009 | ........... B60K 31/047 |

OTHER PUBLICATIONS

Abhijeet Ravankar et al, "Symbiotic Navigation in Multi-Robot Systems with Remote Obstacle Knowledge Sharing", sensors, Jul. 5, 2017, p. 1581, vol. 17, No. 7 Relevance is indicated in the EESR of Apr. 10, 2019.

Extended European search report dated Apr. 10, 2019 in a counterpart European Patent Application.

* cited by examiner

MOBILE MANIPULATOR, METHOD FOR CONTROLLING MOBILE MANIPULATOR, AND PROGRAM THEREFOR

CROSS-REFERENCES TO RELATED APPLICATIONS

This application claims priority to Japanese Patent Application No. 2017-215398 filed Nov. 8, 2017, the entire contents of which are incorporated herein by reference.

FIELD

The disclosure relates to a mobile manipulator, a method for controlling a mobile manipulator, and a program therefor.

BACKGROUND

In recent years, conveying apparatuses called MoMa (Mobile Manipulator) have been known that are obtained by attaching a manipulator to an AGV (Automatic Guided Vehicle. An AGV is an unmanned conveying apparatus configured to move automatically without a human operator's driving operation. Attaching a manipulator to this AGV makes it possible to transport parts, work-in-progress, and finished products in factories, for example.

JP 2014-119903A discloses a controller for moving a part of a moving object that is to be controlled along a predetermined path in order to control the moving object even if the moving object has low rigidity, the controller acquiring a state of the part to be controlled, calculating a compensation amount, and generating a movement command to the moving object based on this compensation amount.

JP 2014-30857A discloses a robot that has upper arms 11, and shoulder joints 7 for driving the upper arms 11, in order to detect vibrations of many movable units using a small number of sensors, sensor sockets 10 for detachably supporting inertial sensors configured to detect vibrations of the upper arms 11 being installed in the shoulder joints 7.

JP 2014-119903A and JP 2014-30857A are examples of background art.

SUMMARY

However, unlike a robot fixed to a predetermined position, a MoMa is capable of working anywhere. Thus, a desired control may not be appropriately executed, depending on environments of work locations in some cases. For example, it was confirmed that a MoMa also resonated near an apparatus with large vibrations, such as a press machine, and it was difficult to accurately position a leading end of the manipulator. Specifically, when a material is conveyed by the MoMa and is introduced into an apparatus at its movement destination, if the manipulator cannot be accurately positioned, the MoMa fails to introduce the material to the apparatus. It is found that this failure will reduce the operation rate of the apparatus resulting from insufficient material, cause clogging with the material due to the material being introduced at a wrong position, and cause adverse effects that the material falls on a floor or the like and deteriorates its surrounding environment.

In view of this, an aspect may provide a mobile manipulator for realizing a control adaptive to the environment at a movement destination, a method for controlling the mobile manipulator with which a control adaptive to the environment at the movement destination is realized, and a program for realizing a control adaptive to the environment at the movement destination.

A mobile manipulator according to an aspect of this disclosure includes a moving apparatus for moving from a first position to a second position, a manipulator that is connected to this moving apparatus, a controller configured to control the moving apparatus and the manipulator, and an environment acquisition sensor configured to acquire environmental data in association with a position of the moving apparatus, in which the controller controls at least one of the moving apparatus and the manipulator based on environmental data that is acquired by the environment acquisition sensor and is associated with the position at the movement destination or any point on a movement path between the first position and the second position.

With this configuration, because the environmental data is acquired in association with the position at the movement destination, it is possible to provide a manipulator capable of realizing a control adaptive to the environment at the movement destination.

Here, the manipulator connected to the moving apparatus is preferably placed on the moving apparatus. Also, the environmental data includes any of data including the amount of vibration, the amplitude of a vibration, vibration frequency, temperature, brightness, noise, and the volume of sound that originate from the environment at the movement destination (for example, a manufacturing apparatus installed near the movement destination), and information generated using these pieces of data.

Also, the moving apparatus may be configured to move on a plurality of points, the environment acquisition sensor may be configured to acquire environmental data at the plurality of points that are movement destinations, and the controller may be capable of controlling at least one of the moving apparatus and the manipulator based on the environmental data at each of the plurality of points.

With this configuration, the environmental data is acquired at the plurality of points that are movement destinations, a control can be performed based on these pieces of the environmental data, and thus the manipulator can be further adaptive to the environment at the movement destination.

Note that the "points" include the first position and the second position, and any positions on the moving path.

Also, the "movement destinations" include not only a certain point such as the first position or the second position serving as the end point but also any points on the moving path on the way, for example.

Also, the controller may execute a position estimation program for estimating a position of the controller, the environment acquisition sensor may be configured to acquire environmental data in each of a plurality of sections in a region where the manipulator is movable by the moving apparatus, and the controller may control at least one of the moving apparatus and the manipulator based on the environmental data corresponding to a section into which the position of the controller falls that is estimated by the position estimation program.

This configuration makes it possible to acquire the environmental data of each predetermined section and perform control based on the environmental data corresponding to the section into which the position of the controller falls, and thus by acquiring the environmental data of each section in advance, a plurality of manipulators can utilize the environmental data.

Note that the "section" refers to a region where environmental data will be handled in a similar manner, such as a damping filter, and the section includes regions that can be handled as having the same environmental data.

Also, the environment acquisition sensor may be configured to acquire the amplitude of a vibration at the movement destination as the environmental data, and the controller may control at least one of the moving apparatus and the manipulator based on the amplitude of the vibration.

With this configuration, because the amount of vibration at the movement destination can be acquired as the environmental data, it is possible to suppress resonance of the manipulator.

Also, the environment acquisition sensor may include an acceleration sensor for acquiring the amplitude of a vibration at the movement destination as environmental data, and the controller may control the moving apparatus such that a moving velocity of the moving apparatus is a first velocity in a region including a point having an amplitude of at least a predetermined value, and the moving velocity of the moving apparatus is a second velocity that is larger than the first velocity in a region including a point having an amplitude of less than the predetermined value.

With this configuration, it is possible to change the moving velocity in accordance with the amount of vibration at the movement destination, and thus to prevent the manipulator from falling over, for example.

Also, the environment acquisition sensor may include an acceleration sensor for acquiring an amplitude of a vibration at the movement destination as environmental data, and the controller may execute an amplitude estimation program for estimating an amplitude of a vibration at a next point based on the amplitudes at a plurality of points, and if the estimated amplitude is at least a predetermined value at the next point, the controller may control the moving apparatus such that at least one of a moving velocity at which the moving apparatus moves to the next point, a moving acceleration at which the moving apparatus moves to the next point, and a control gain of the moving apparatus that moves to the next point is not more than a predetermined value.

With this configuration, the environmental data is acquired at the movement destination in advance, and the moving apparatus can be controlled based on the environmental data at the next point, and thus it is possible to perform a control adaptive to the environment at the movement destination.

Also, the environment acquisition sensor may be configured to acquire, as the environmental data, the amplitude of a vibration in each of the plurality of sections in a region where the manipulator is movable by the moving apparatus, and the controller may control at least one of the moving apparatus and the manipulator based on an amplitude of the vibration corresponding to a section into which the position of the controller falls that is estimated based on the position estimation program.

This configuration makes it possible to acquire the amount of vibration in each predetermined section, and perform a control based on the amount of vibration corresponding to the section into which the position of the controller falls, and thus it is possible to perform a control adaptive to the section.

Also, the environmental data acquired by the environment acquisition sensor may include data measured by another mobile manipulator.

With this configuration, it is possible to utilize the environmental data acquired by the other manipulator, and thus to perform a control adaptive to the environment at the movement destination in advance.

Also, the environment acquisition sensor may be configured to acquire the amplitude and a frequency of a vibration at the movement destination as environmental data, and the controller may be configured to be capable of controlling the moving apparatus or the manipulator based on a first control mode or a second control mode for suppressing a vibration with a predetermined frequency, and configured to select the first control mode or the second control mode based on the amplitude and the frequency of the vibration.

With this configuration, it is possible to select a control mode corresponding to the amount of vibration at the movement destination, for example, and thus to effectively suppress resonance, for example.

Also, a configuration is possible in which the environment acquisition sensor acquires, as the environmental data, information reflecting a frequency of a vibration in each of the plurality of sections in the movable region, and the controller controls the manipulator using a damping filter based on the section into which the position of the controller falls that is estimated by the position estimation program, and the frequency of the vibration in this section.

With this configuration, information reflecting the frequencies of the vibrations in the plurality of sections is acquired as environmental data, and a damping filter is used based on the information on the frequency, and thus resonance can be suppressed.

Also, a configuration is possible in which the manipulator is a multi-articulated robot arm including a plurality of servo motors and a plurality of links that are driven by the plurality of servo motors, and the environment acquisition sensor acquires, as environmental data, the frequency of a vibration at a point based on a response received when a signal including a frequency in a predetermined band is input to at least one of the servo motors.

With this configuration, with the multi-articulated robot arm including the plurality of links that are driven by the plurality of servo motors, the frequency of the vibration at this point can be acquired as environmental data based on a response when the signal is input to the servo motor, and thus it is possible to acquire environmental data using a manipulator having such a hardware configuration.

Also, the environment acquisition sensor may acquire a temperature at the movement destination as environmental data.

With this configuration, it is possible to perform control taking the temperature at the movement destination into consideration.

Also, a configuration is possible in which the manipulator is a multi-articulated robot arm including a plurality of servo motors and a plurality of links that are driven by these servo motors, and if the temperature has at least a predetermined value and a load factor of at least one of the servo motors is at least a predetermined value, the controller reduces at least one of torque and an electric current value of the servo motor such that the load factor of the servo motor is not more than the predetermined value.

With this configuration, if the temperature has at least the predetermined value and the load factor of at least one of the servo motors is at least the predetermined value, at least one of the torque and the electric current value of the servo motor is reduced such that the load factor of the servo motor is not more than the predetermined value, and thus malfunctions and abnormal stop of the robot arm caused by the robot arm being operated with high load in a high-temperature environment are suppressed, and the production efficiency can be increased by extending a time period during which the robot arm can operate in a robust manner.

Also, a configuration is possible in which the mobile manipulator includes an image capture sensor for capturing an image of a surrounding environment, the environment acquisition sensor acquires, as environmental data, information on illuminance originating from a lighting environment at the movement destination, and the controller controls the moving path on which the manipulator is moved by the moving apparatus, based on the illuminance information.

With this configuration, because the information on the illuminance originating from the lighting environment at the movement destination is acquired as the environmental data, and the moving path on which the manipulator is moved by the moving apparatus is controlled based on the illuminance information, it is possible to take a path with a higher illuminance, and thus it is possible to more accurately recognize an object and improve the control performance of the manipulator.

Also, a configuration is possible in which the controller controls the image capture sensor based on the illuminance information.

With this configuration, it is possible to control the image capture sensor based on the illuminance information at the movement destination, and thus to capture an image of the environment in a state of the illuminance that is suitable for image capture.

Also, the environment acquisition sensor is configured to acquire, as environmental data, the frequency of a noise signal generated, originating from the lighting environment at the movement destination, and the controller can subject the image data obtained by the image capture sensor to image processing based on the frequency of the noise signal.

With this configuration, because the frequency of the noise signal generated, originating from the lighting environment at the movement destination can be acquired as the environmental data and image data obtained by the image capture sensor can be subjected to image processing, it is possible to eliminate noise that is dependent on the lighting that is part of an external environment and to improve the ability of the manipulator recognizing a nearby object.

Also, a configuration is possible in which the environment acquisition sensor includes a sound collecting microphone for acquiring, as environmental data, a level and the frequency of noise generated, originating from an environment at the movement destination, and the controller controls the moving path on which the manipulator is moved by the moving apparatus, based on the level and the frequency of noise.

With this configuration, because the level and the frequency of noise generated, originating from the environment at the movement destination can be acquired as environmental data, by acquiring information resulting from vibrations or the like of another apparatus using a simple sensor and selecting a path with a small specific frequency component, it is possible to prevent the manipulator from falling over and to suppress vibrations of the leading end of the manipulator, which are caused by the frequency, for example.

Also, a method for controlling a mobile manipulator according to an aspect of this disclosure is a method for controlling a moving apparatus for moving from a first position to a second position, and a manipulator that is connected to the moving apparatus, the method including a step of acquiring environmental data in association with a position of the moving apparatus, using an environment acquisition sensor, and a step of controlling at least one of the moving apparatus and the manipulator based on the environmental data that is acquired by the environment acquisition sensor, and is associated with the position at the movement destination or any point on a moving path between the first position and the second position.

With this configuration, because the environmental data is acquired in association with the position at the movement destination, it is possible to provide a method for controlling a manipulator with which a control adaptive to the environment at the movement destination can be realized.

Also, a program according an aspect of this disclosure causes a computer for controlling a moving apparatus for moving from a first position to a second position and a manipulator that is connected to the moving apparatus, to execute a step of acquiring predetermined environmental data originating from an environment at the movement destination to which the manipulator is moved by the moving apparatus, using an environment acquisition sensor, the environmental data being acquired in association with a position at the movement destination, and a step of controlling at least one of the moving apparatus and the manipulator based on the environmental data that is acquired by the environment acquisition sensor, and is associated with the position at the movement destination or any point on a moving path between the first position and the second position.

With this configuration, because the environmental data is acquired in association with the position at the movement destination, it is possible to provide a program capable of realizing a control adaptive to the environment at the movement destination.

According to an aspect, it is possible to provide a mobile manipulator for realizing a control adaptive to the environment at a movement destination, and a method for controlling the mobile manipulator with which a control adaptive to the environment at a movement destination is realized, and a program for realizing a control adaptive to the environment at a movement destination.

DETAILED DESCRIPTION

First Embodiment

Figure 1:
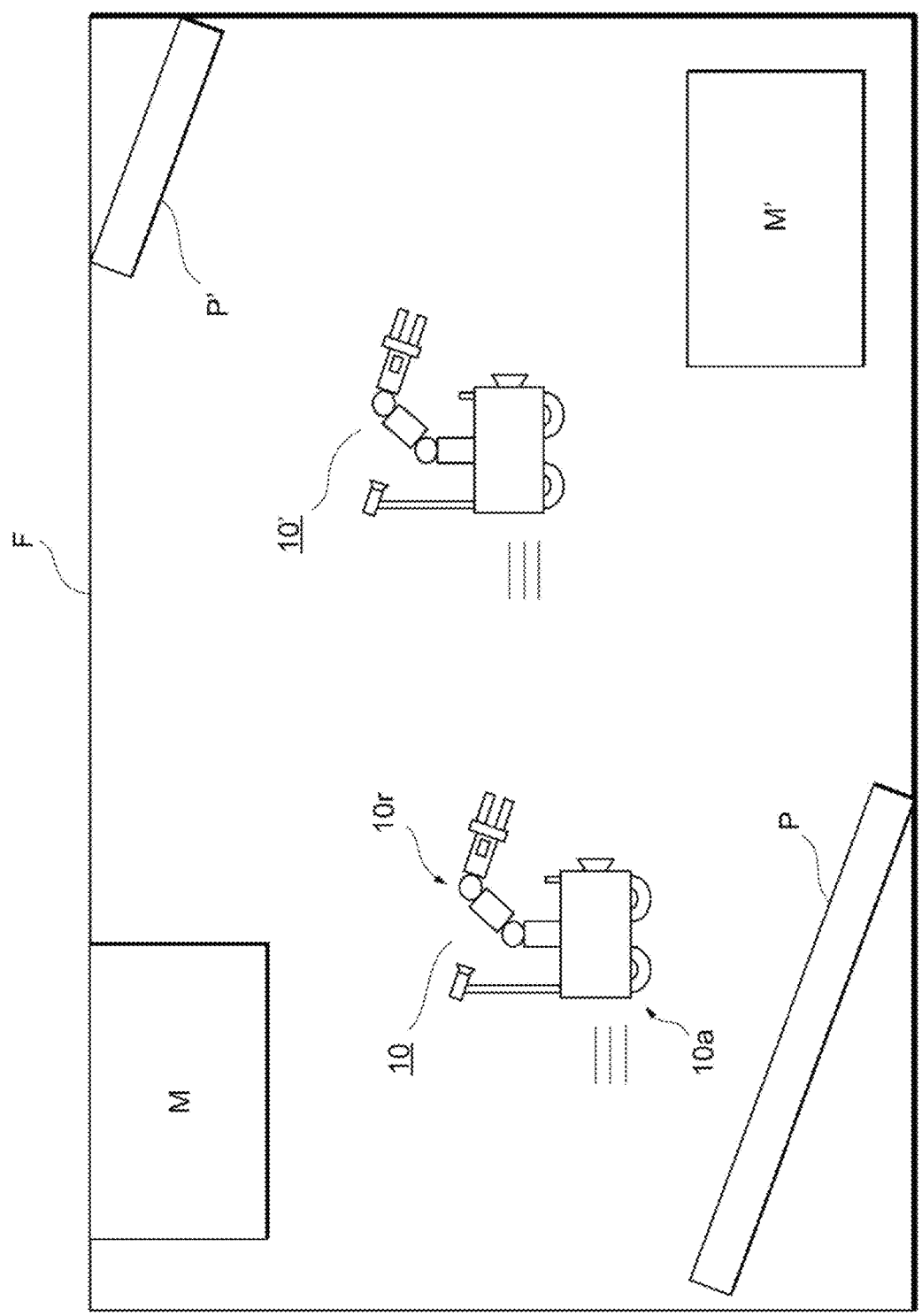
FIG. 1 is a diagram illustrating a situation in which a MoMa and a MoMa move on a floor.

First, the summary of an embodiment to which an aspect is applied will be described using FIG. 1. FIG. 1 shows a situation in which mobile manipulators called MoMa (mobile manipulators) 10 and 10' move on a floor F in a factory. The MoMa 10 and the MoMa 10 have the same configuration. Apparatuses M and M' that generate vibrations are installed on the floor F. Also, the floor F is not necessarily a flat surface, and includes regions P and P' that protrude from the floor surface due to a cable cover for a floor surface, for example.

The MoMa 10 includes a moving apparatus 10a (an example of a "moving apparatus") that is an AGV (automatic guided vehicle), and a robot arm 10r (an example of the "manipulator") attached onto the moving apparatus 10a. The robot arm 10r includes a plurality of servo motors and a plurality of links that are driven by these servo motors. Also, this MoMa 10 acquires, as environmental data E1 in advance, the amount of vibration (an example of "environmental data") of the floor F caused by the apparatuses M and M', and stores the environmental data in a storage means of the MoMa (not shown), for example. Note that environmental data is collectively referred to as environmental data E, and various pieces of data belonging to the environmental data E are referred to as environmental data E1, environmental data E2, and the like, hereinafter. Note that the robot arm 10r may also include a gripper G and a suction pad, which will be described later, for example. The environmental data E is generated by the controller 10g, which will be described later, associating a value acquired by the environment acquisition sensor 10s with information on the position of the MoMa 10 at this time, for example.

The environmental data E is stored in association with the positions. In an embodiment, the environmental data E is acquired as a function of the positions on the floor F, and the environmental data E can be acquired by another MoMa 10' measuring points on the floor F while moving, for example. The environmental data E includes data including the frequencies of vibrations, temperature, brightness, frequency of noise, and the volume of sound that originate from the environment at the movement destination (a manufacturing apparatus installed near the movement destination, for example), and information created using these pieces of data.

The environmental data E can be acquired by various means, and a human operator may also acquire the environmental data E at each point using a sensor, or the environmental data E may also be calculated based on environmental data in a similar environment and information on the position of the apparatus.

Note that the "point" may be any position including a moving path of the MoMa 10 or another MoMa 10'.

The "movement destination" may also include not only a certain point, for example, the end point, but also any point on the moving path of the MoMa 10 on the way, for example.

The apparatuses M and M' placed on the floor F are operating and thus vibrating. Thus, the shorter the distances to the apparatuses M and M' are, the more powerfully the floor F vibrates. Also, the amplitude and the frequency of a vibration change depending on types of apparatuses M and M' and their operating statuses, for example.

Note that the MoMa 10 stores a program for estimating the position of the MoMa 10 in a storage medium (not shown), and is capable of estimating the current position of the MoMa 10 by executing this program. Furthermore, the MoMa 10 is configured to acquire environmental data E associated with this position, and change the path on which the MoMa 10 moves and the moving velocity based on the environmental data E. Specifically, the MoMa 10 selects a path avoiding positions with a large amount of vibration, reduces the moving velocity at positions with at least a predetermined amount of vibration, and moves to a target position. Furthermore, the robot arm 10r can also be controlled based on environmental data E at the target position. For example, the frequency of a vibration is acquired as the environmental data E in association with the position, a damping filter for suppressing vibrations with this frequency is applied, control data for controlling the robot arm 10r is generated, and thereby resonance of the robot arm 10r can be suppressed. Note that the MoMa 10 may also estimate the position of the MoMa 10 based on a sensor such as a GPS (not shown), or the MoMa 10 may also acquire the estimation of the position of the MoMa 10 based on information of the sensor of the MoMa 10. Note that the amount of vibration refers to information on at least one of the amplitude of a vibration and the frequency of a vibration, and information related to vibrations including information calculated this information.

Such a MoMa 10 can realize a control adaptive to the environment at the movement destination.

Also, because environmental data is acquired in association with positions in advance, the MoMa 10 is capable of realizing appropriate control and avoiding an unrecoverable situation before actually being exposed to the environment. For example, the MoMa 10 can be prevented from falling over by reducing the velocity in advance, before entering a region with a large amount of vibration and a possibility that the MoMa 10 will fall over when moving at not lower than a predetermined velocity.

Hereinafter, a more specific embodiment will be described.

Second Embodiment

First, a second embodiment will be described with reference to the drawings. Note that the same constituent elements are denoted by the same reference numerals, and redundant description will be omitted.

As described above, FIG. 1 is a schematic diagram showing a situation in which a plurality of the MoMas 10 move in a factory in which a plurality of apparatuses serving as vibration sources are installed.

Each MoMa 10 is capable of freely moving on the floor F, avoiding the apparatuses, which are obstacles. The number of MoMas 10 moving on the floor F can be freely selected in accordance with purposes and environments, and the number of MoMas 10 may also be one, two, or more. The apparatuses M and M' may be machine tools such as press machines, or conveyors, for example. An apparatus such as a press machine that repeats the same operation at a predetermined cycle generates vibrations with various frequencies accompanying vibrations at a predetermined cycle that are generated by its operation and an operation of a component (for example, a motor) for executing this operation, and the generated vibrations are transmitted to the floor F. Thus, the amount of vibration and the frequencies of vibrations change in accordance with the position on the floor F.

Figure 2:
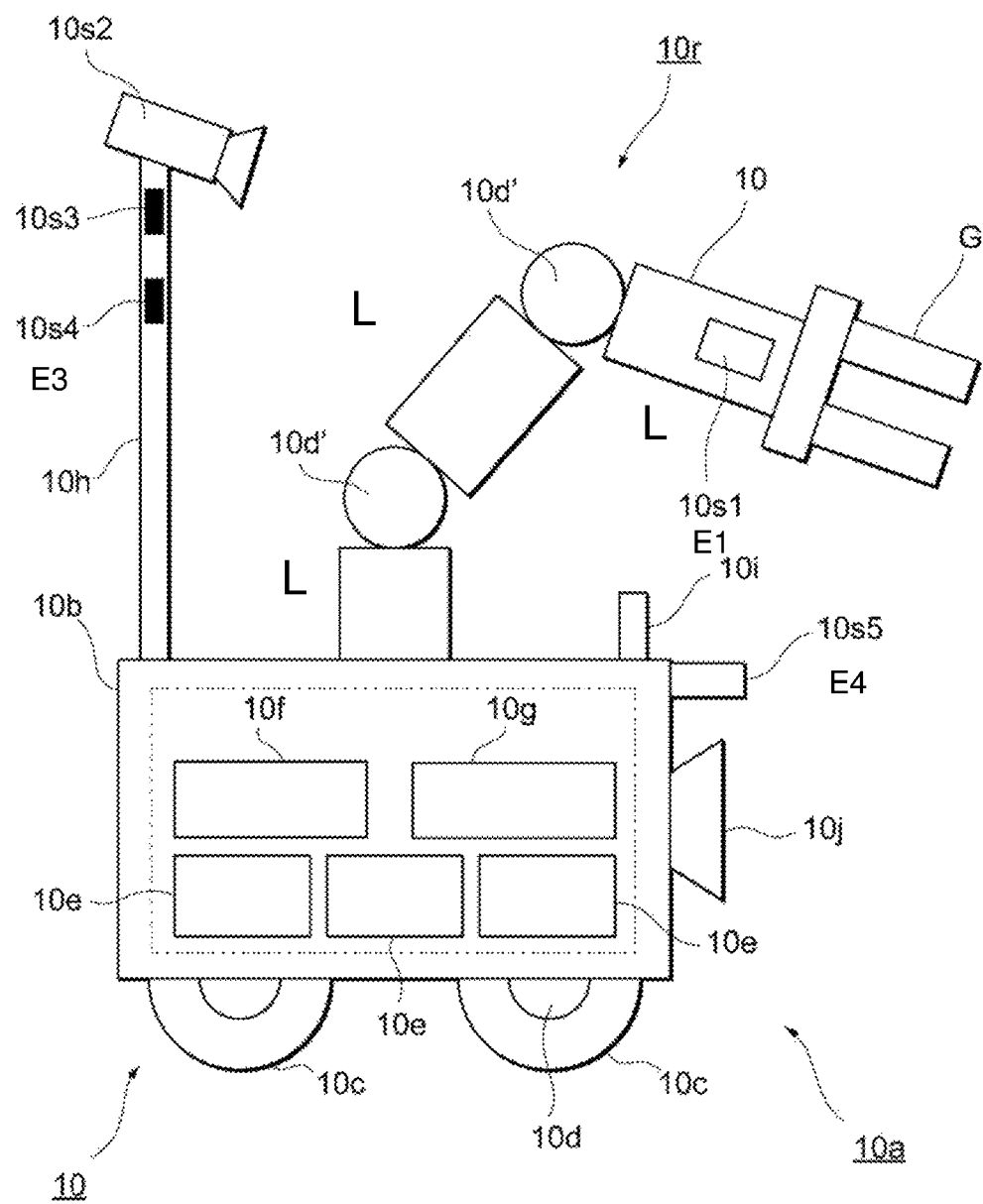
FIG. 2 is a diagram illustrating a schematic configuration of a MoMa.

FIG. 2 shows the configuration of a MoMa 10. This MoMa 10 includes the robot arm 10r as a manipulator, the moving apparatus 10a to which this robot arm 10r is attached, and various environment acquisition sensors 10s (examples of the "environment acquisition sensor") for acquiring environmental data E at the movement destination.

The moving apparatus 10a includes a vehicle body 10b, wheels 10c for moving, and servo motors 10d for driving the wheels 10c.

The inner portion of the vehicle body 10b includes a plurality of servo drivers 10e configured to respectively supply electric current for control to the servo motors 10d and servo motors 10d' for driving the robot arm 10r. Also, a battery 10f serving as a power source for constituting elements of the MoMa 10 and a controller 10g for individually controlling the robot arm 10r and the moving apparatus 10a are installed in the inner portion of the vehicle body 10b.

The robot arm 10r is a multi-articulated robot constituted by a plurality of links L and the plurality of servo motors 10d' for driving these links L. Because the gripper G serving as an end effector is connected to the link L at the leading end, an object can be held at the movement destination. Also, an acceleration sensor 10s1 (an example of an "environment acquisition sensor") is installed inside the link L at its leading end. This robot arm 10r may also be provided with an image sensor (not shown) that is configured to recognize and hold an object.

A support column 10h for mounting various environment acquisition sensors 10s are installed in the vehicle body 10b. This support column 10h is fixed substantially perpendicularly to an upper surface of the vehicle body 10b. An image sensor 10s2 (an example of the "environment acquisition sensor"), an illuminance sensor 10s3 (another example of the "environment acquisition sensor"), and a temperature sensor 10s4 (another example of the "environment acquisition sensor") are mounted inside the upper portion of the support column 10h.

Because various environment acquisition sensors 10s2 to 10s4 are installed in the support column 10h fixed to the vehicle body 10b separately from the robot arm 10r, even if the robot arm 10r operates, the various kinds of environmental data E originating from the environments at the movement destinations to which the MoMa 10 moves can be highly accurately acquired without being influenced by the robot arm 10r.

Also, a front surface of the vehicle body 10b is provided with a sound collecting microphone 10s5 (an example of the "environment acquisition sensor") for acquiring information on sound at the movement destination to which the MoMa 10 moves.

Furthermore, the front surface of the vehicle body 10b is provided with a wireless antenna 10i for transmitting and receiving information such as the environmental data E to/from the outside, and an LRF (Laser Range Finder) 10j for measuring the distance to nearby objects. The LRF 10j is capable of measuring the distance to nearby objects by scanning a laser beam to its front and detecting the reflected beam. Thus, the MoMa 10 is capable of moving on the floor F without colliding with nearby objects, using the distance information received from the LRF 10j.

Figure 3:
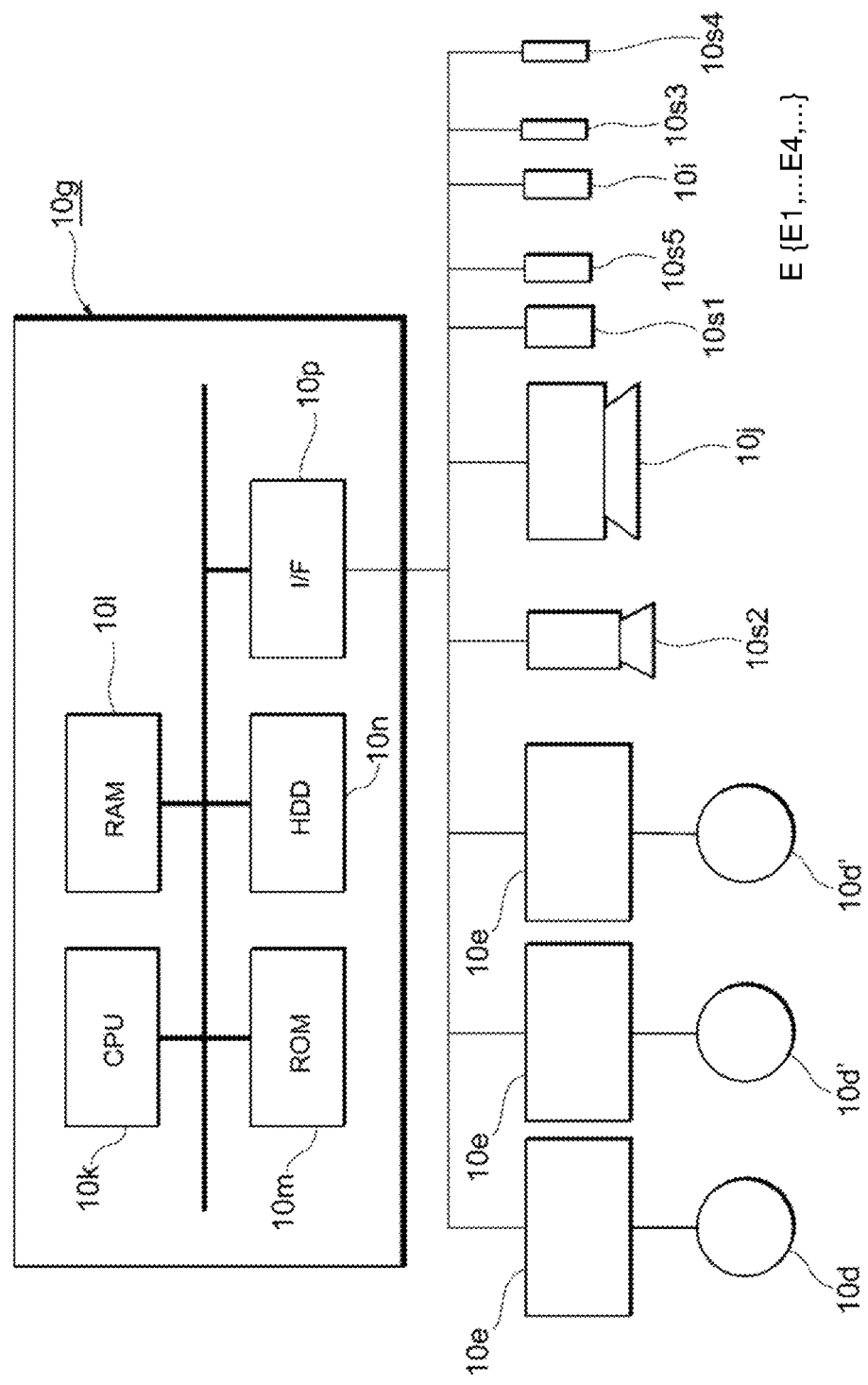
FIG. 3 is a diagram illustrating a schematic configuration of a controller.

FIG. 3 shows a diagram of the configuration of the controller 10g. The controller 10g includes a CPU 10k provided with a processor for arithmetic processing, such as a CPU (Central Processing Unit), a RAM 10l that is a volatile temporal storage device such as an SRAM (Random Access Memory), a ROM 10m that is a non-volatile semiconductor storage device (e.g., a NOR flash memory), and an HDD 10n (e.g., hard disk drive) that is an external storage device, and a communication interface 10p.

The CPU 10k reads out a program stored in the ROM 10l, or acquires a program from the outside using a wireless or wired communication interface 10p and executes the program.

The RAM 10l is capable of using part of a program or calculation data for temporal storage.

The ROM 10m is a storage medium for storing a program executed by the CPU 10k.

The HDD 10n is a medium for storing information electrically, magnetically, optically, mechanically, chemically, or by their combination, such that the information can be read using an external device such as a computer, and the HDD 10n may be constituted by a CD, a DVD, a magnetic disk, an MO, a semiconductor flash memory such as a USB memory, or an HDD, for example. The HDD 10n is capable of storing a program executed by the CPU 10k (a program for determining a moving velocity or a moving path of the moving apparatus 10a of the MoMa 10, controlling and driving the moving apparatus 10a, a program for controlling and driving the robot arm 10r, a position estimation program for estimating the current position of the MoMa 10, and an amplitude estimation program for estimating the amplitude at the position of the movement destination) and the environmental data E acquired by the environment acquisition sensors 10s1 to 10s5, for example.

The communication interface 10p includes a wireless LAN (Local Area Network) interface for giving and receiving information to/from the outside via a wireless antenna 10i. Furthermore, the communication interface 10p is constituted by various interfaces for receiving information from the environment acquisition sensors 10s1 to 10s5 and LRF 10j. The communication interface 10p also includes interfaces with the servo drivers 10e, and is capable of acquiring the information on rotation positions of the links L via the servo drivers 10e, and transmitting data for control to the servo drivers 10e based on the information on these rotation positions.

Note that the controller 10g may also be constituted integrally with the servo drivers 10e. At this time, the ROM 10m of the controller 10g holds a program for calculating an electric current to be supplied to the servo motors 10d', and the CPU 10k reads out and executes this program.

Figure 4:
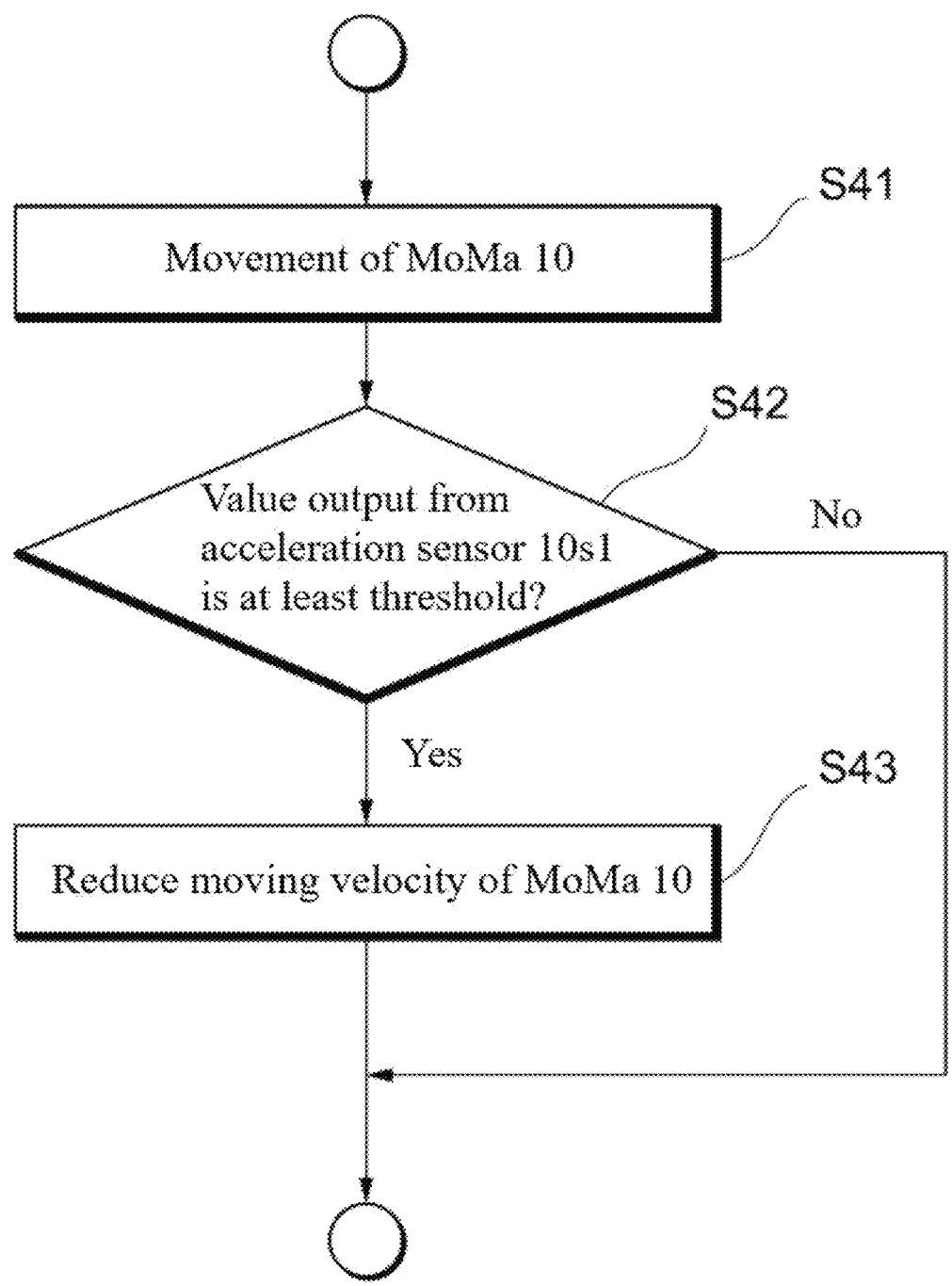
FIG. 4 is a flowchart illustrating a method for controlling a MoMa according to an embodiment.

FIG. 4 shows a flowchart of a method for controlling the MoMa 10 according to an embodiment. This arithmetic processing is executed by the CPU 10k that has read out the program stored in the ROM 10m or the HDD 10n.

First, the MoMa 10 starts moving toward any position on the floor F in a factory (step S41).

During the movement, the controller 10g acquires data measured by the acceleration sensor 10s1 mounted in the link L of the robot arm 10r via the communication interface 10p, and determines whether or not the acceleration of the MoMa 10 is at least a predetermined threshold (step S42).

Here, by selectively executing such determination processing when the MoMa 10 moves at a constant velocity and its acceleration is zero, environmental data E originating from an external environment can be acquired with high accuracy.

In step S42, if the acceleration is less than the threshold, the flowchart ends and the processing returns to step S41 again.

In step S42, if the acceleration is at least a predetermined threshold, the controller 10g transmits a control signal for controlling the servo motors 10d of the wheels 10c to the servo drivers 10e such that the MoMa 10 decelerates (step S43).

For example, these steps S41 to S43 are executed during constant-velocity movement at a predetermined time in a repetitive manner.

The acceleration sensor 10s1 mounted inside the link L at the leading end of the robot arm 10r can be used for the purpose of measuring the acceleration of the robot arm 10r with respect to the vehicle body 10b, and measuring vibrations of the robot arm 10r while the robot arm 10r operates such as holding an object. In an embodiment, furthermore, while the robot arm 10r does not move with respect to the vehicle body 10b that serves as the base and the robot arm 10r and the vehicle body 10b are moved integrally (together) by the moving apparatus 10a, this acceleration sensor 10s1 can be used in order to acquire information on vibrations (environmental data) originating from the surrounding environment at the movement destination to which the MoMa 10 moves (including a path on the way). Thus, an embodiment can be applied without greatly changing the hardware configuration of the existing manipulator.

When the MoMa 10 passes through the vicinity of the apparatus M or M' that is a vibration source, the output value of data measured by the acceleration sensor 10s1 increases, and thus reducing the moving velocity of the MoMa 10 at this time makes it possible to avoid a situation in which the MoMa 10 resonates with vibrations of the apparatus M or M' and falls over. Although the MoMa in which a manipulator is installed in an upper portion of the vehicle body, for example, has a high center of gravity and thus has a risk of falling over, use of the MoMa 10 according to an embodiment makes it possible to prevent the MoMa from falling over caused by an external vibration source.

Note that the threshold in step S42 may also dynamically change. Control may also be performed using the reciprocal of the value measured by the acceleration sensor S1 such that the MoMa 10 decelerates if the acceleration is not more than a predetermined threshold. In addition, the threshold or its range can be changed as appropriate.

The MoMa 10 may also be configured to move along a predetermined moving path. However, a MoMa that autonomously selects a path in a predetermined region may select a path whose external environment is not known, and thus acquisition of environmental data by applying the control method according to an embodiment has a great effect.

Also, the robot arm 10r can be applied widely to not only a device for holding an object with the gripper G but also a manipulator or the like for performing a predetermined operation.

Modification

Hereinafter, the case where the moving velocity of the MoMa 10 is controlled not by the actual value of the acceleration but by a predicted value will be described as a modification of a second embodiment.

Figure 5A:
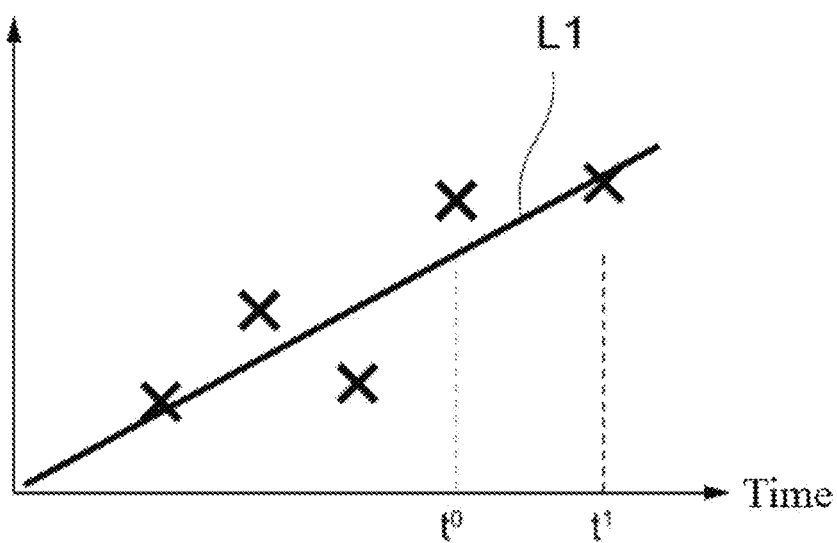
FIG. 5A and FIG. 5B are diagrams illustrating a graph for predicting an acceleration.

FIG. 5A shows a graph for predicting the acceleration based on the past acceleration. The horizontal axis represents the time, and the vertical axis represents the magnitude of the acceleration.

As shown in FIG. 5A, a value V1 of the acceleration at a future time V can be predicted by approximating a value of the acceleration at the current time to and the previous time using a linear line L1. The next control cycle or a predetermined number of seconds can be set as the future time V.

Furthermore, a configuration may also be adopted in which the predicted value V1 of the acceleration is compared with the threshold in step S'42, instead of step S42.

Figure 6:
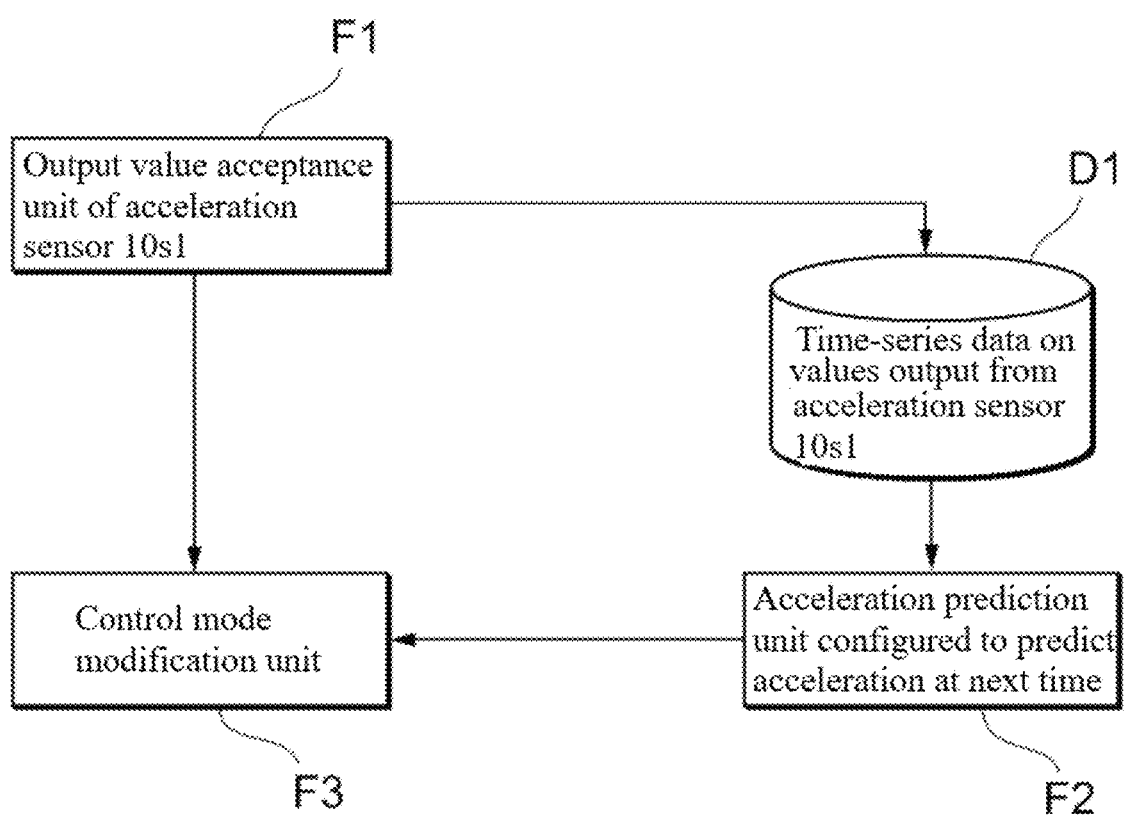
FIG. 6 is a diagram illustrating functional blocks for executing a control method according to a modification of a second embodiment.

FIG. 6 shows a diagram of functional blocks for executing a control method according to such a modification of a second embodiment. These functions can be realized by the controller 10g executing a program (an example of the "amplitude estimation program") that is stored in the ROM 10m or the HDD 10n.

First, an output value acceptance unit F1 of the acceleration sensor 10s1 accepts information indicating the acceleration of the MoMa 10 that is output from the acceleration sensor 10s1.

The accepted information indicating the acceleration is acquired in association with this time and the position of the MoMa at this time as time-series data D1. The data can be temporarily stored in the RAM 10l, for example.

An acceleration prediction unit F2 calculates a linear approximation line, and predicts the acceleration at the future time V based on these pieces of time-series data.

If the acceleration is at least a threshold at the predicted future time t', a control mode modification unit F3 switches to a control mode for operating at a low velocity.

If the MoMa 10 approaches a vibration source, the output from the acceleration sensor 10s1 should gradually increase over time, and thus the value output from the acceleration sensor 10s1 at the future time can be predicted with high accuracy through linear approximation. Furthermore, it is possible to control the MoMa 10 so as to decelerate in advance, before the actual value of the acceleration sensor 10s1 is at least a predetermined value, and thus it is possible to prevent the MoMa 10 from falling over beforehand, for example. Note that approximation is not limited to linear approximation, and may also be nth order approximation (where n is an integer of at least 2).

The object to be controlled is not limited to the moving velocity of the MoMa 10, and may also be the acceleration or a control gain of the MoMa 10, or a combination thereof. Alternatively, a configuration may also be adopted in which a normal control mode and a control mode for resonance suppression are stored in the ROM 10m in advance, and the control mode modification unit F3 switches the control mode in accordance with the output from the acceleration sensor 10s1.

Figure 5B:
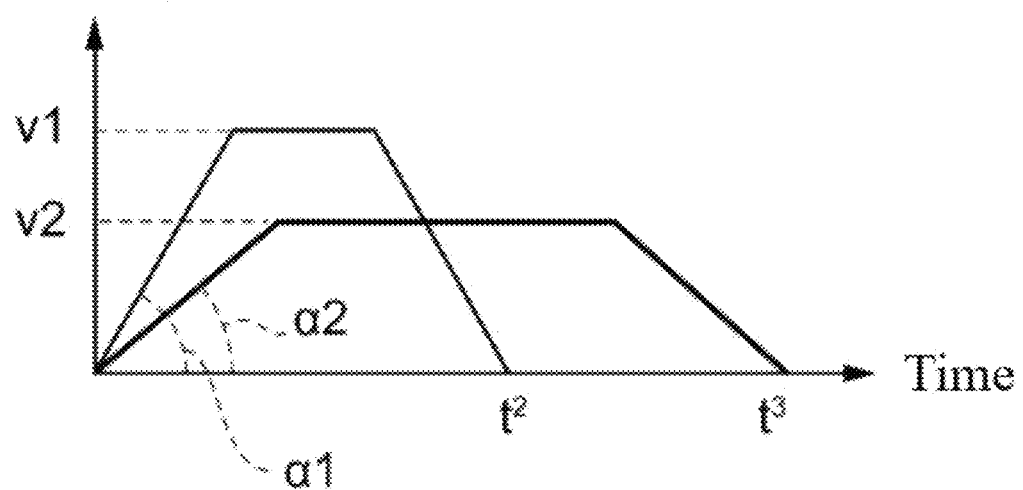

FIG. 5B is a graph showing a change in the moving velocity of the MoMa 10 when the acceleration and the velocity are controlled. As shown in FIG. 5B, when the MoMa 10 is originally controlled to accelerate at an acceleration of $\alpha_1$ to a velocity $v_1$, by controlling, in an environment with large vibrations, the MoMa 10 to accelerate at an acceleration of $\alpha_2$ that is smaller than $\alpha_1$ until reaching a velocity $v_2$ that is smaller than $v_1$, the movement time required to move the same movement distance increases from $t^2$ to $t^3$, but it is possible to reduce the inertial force applied to the robot arm 10r and make the MoMa 10 difficult to vibrate. Also, if the control gain is lowered, the property of tracking disturbance as vibrations is diminished, and thus resonance resulting from vibrations can be suppressed.

Note that the velocity (or acceleration or control gain) may also be reduced by a predetermined amount that has been determined in advance, or may also be controlled using the value of the acceleration sensor 10s1 as a coefficient such that the larger the value of the acceleration sensor 10s1 is, the further the velocity decreases, for example.

Because the MoMa 10 can be controlled by applying such a modification as described above such that resonance is suppressed before resonance starts, it is possible to effectively reduce a risk of falling over.

Third Embodiment

Hereinafter, a third embodiment will be described. The description of the content that is the same as that of other embodiments will be omitted or simplified, and mainly the differences will be described.

A MoMa 10 according to an embodiment is configured to control a moving apparatus 10a and a robot arm 10r utilizing a map that is created in association with positions in advance and that shows the amount of vibration. The map showing the amount of vibration here can be created by the MoMa 10 or another MoMa 10' moving all over the floor F.

Figure 7:
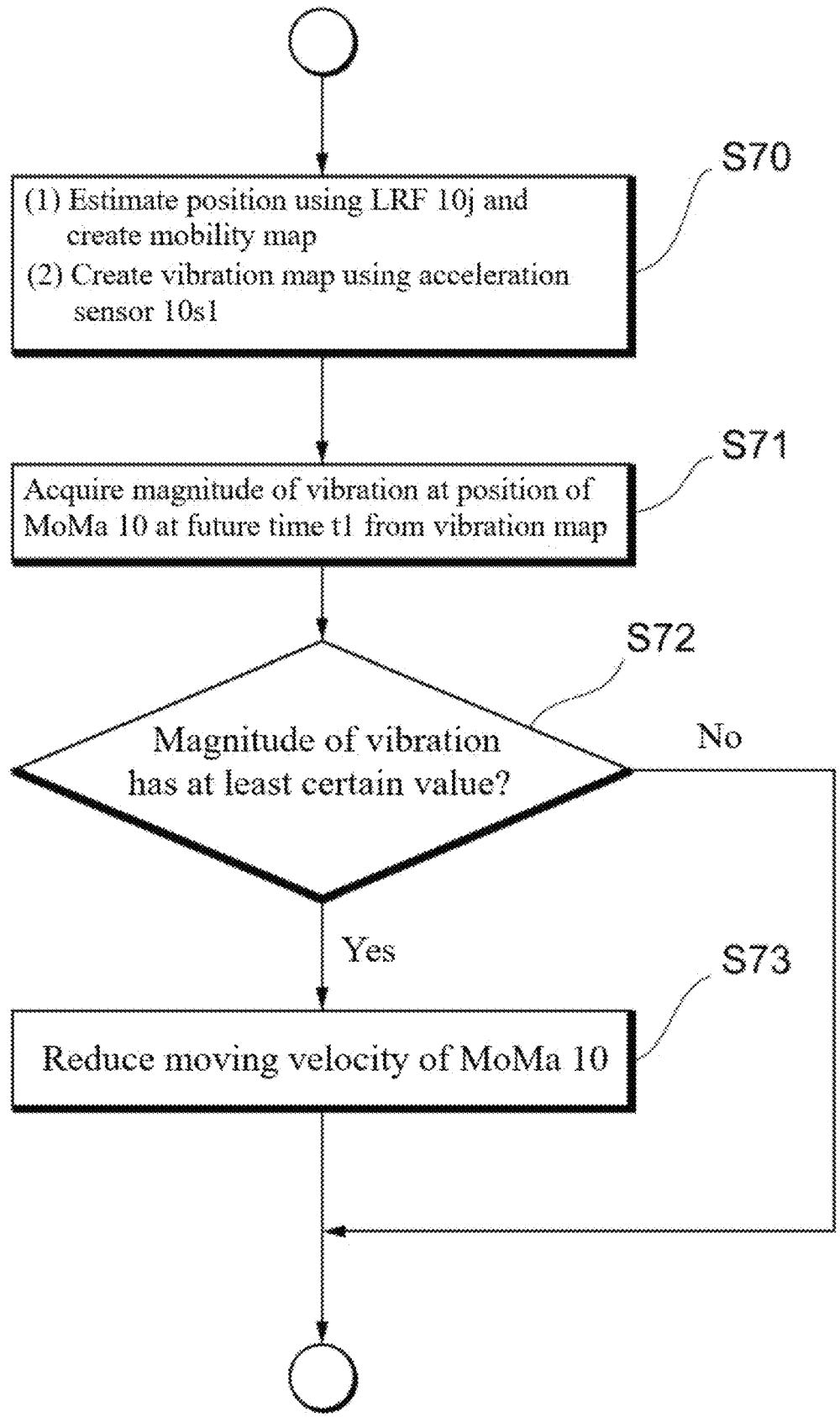
FIG. 7 is a flowchart illustrating a method for controlling a MoMa according to a third embodiment.
Figure 8:
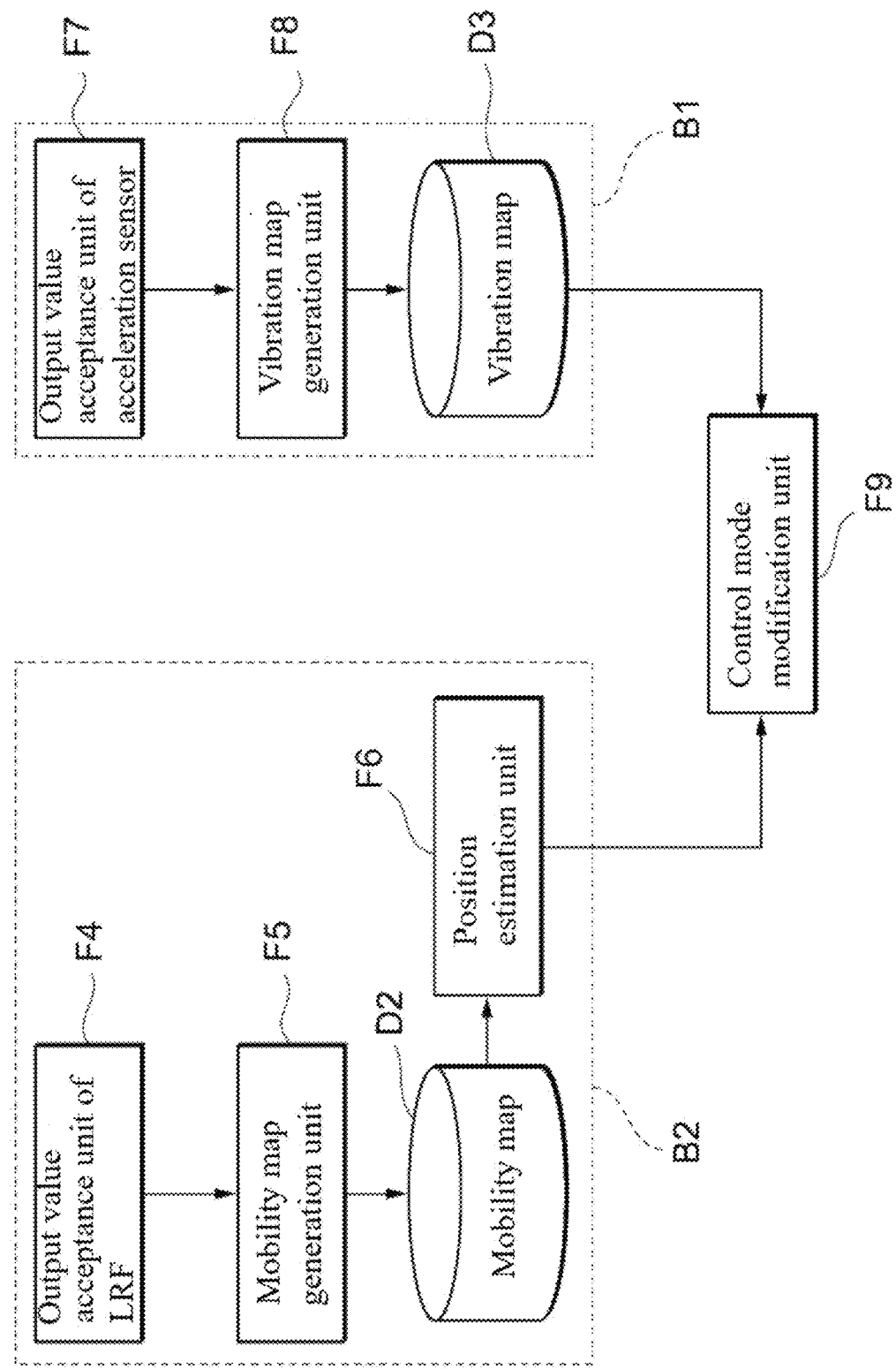
FIG. 8 is a diagram illustrating functional blocks for executing a control method according to a third embodiment.

FIG. 7 shows a flowchart of a method for controlling the MoMa 10 according to a third embodiment. FIG. 8 shows a diagram of functional blocks for realizing such a control method. These functions can be realized by a CPU 10k of a controller 10g executing a program stored in a ROM 10M, for example.

First, the MoMa 10 or another MoMa 10' moves all over the floor F. An output value acceptance unit F4 of an LRF acquires a value output from an LRF 10j while moving here. Moreover, a generation unit F5 configured to generate a map showing a movable range (referred to as "mobility map" hereinafter) repeats a step of generating a map of its surroundings while estimating the position of the generation unit F5. Such a map can be generated using SLAM (Simultaneous Localization and Mapping). The generated mobility map is recorded in an HDD 10n as database D2, and is recorded in an external database via a wireless antenna 10i.

An output value acceptance unit F7 of an acceleration sensor 10s1 of the MoMa 10 or the other MoMa 10' acquires environmental data E1 indicating the amount of vibration using the acceleration sensor 10s1 simultaneously. Then, a generation unit F8 configured to generate a map showing vibration locations (referred to as "vibration map", hereinafter) generates a vibration map by associating the environmental data E1 with the position of the generation unit F8 that is estimated when the environmental data is acquired. The generated vibration map is recorded in an HDD 10n as database D3, and is recorded in an external database via a wireless antenna 10i (step S70). Generation of the vibration map is realized through the above-described steps (block B1).

Figure 9A:
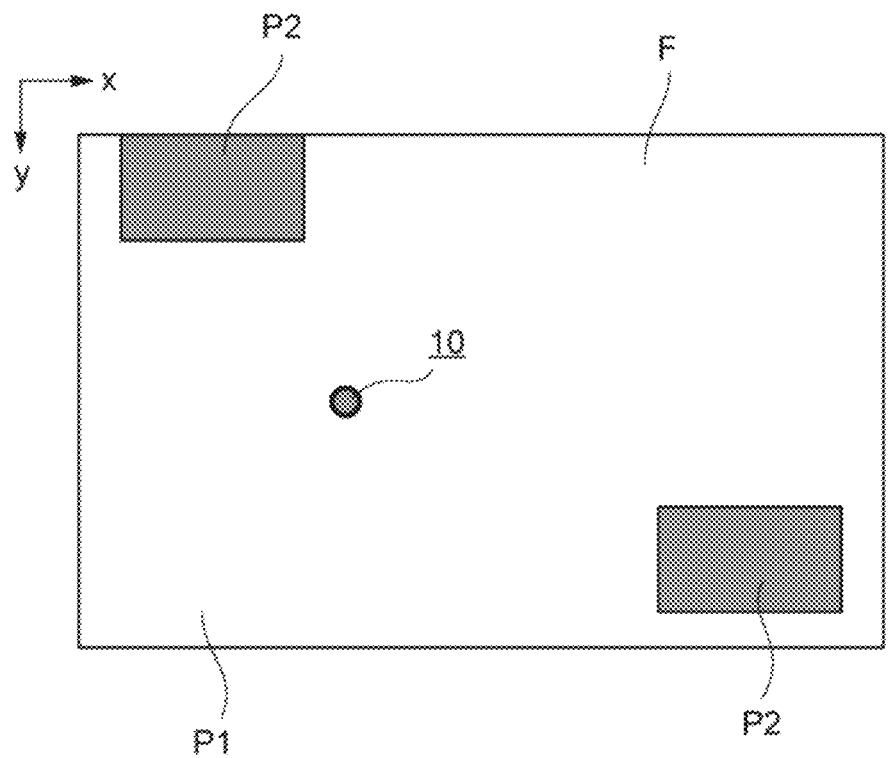
FIG. 9A and FIG. 9B are diagrams illustrating a mobility map and an estimation position of a MoMa.

FIG. 9A shows a mobility map generated by the MoMa 10 moving on the floor F and an estimation position of the MoMa 10. A movable range P1 and an unmovable range P2 (a range to which the MoMa cannot move) are shown.

As shown in FIG. 9A, positions of apparatuses M and M' indicate the unmovable range P2. On the other hand, as a result of determining that the MoMa 10 is movable, regions P and P' protruding from the floor surface of the floor F are recognized as the movable range P1.

Figure 9B:
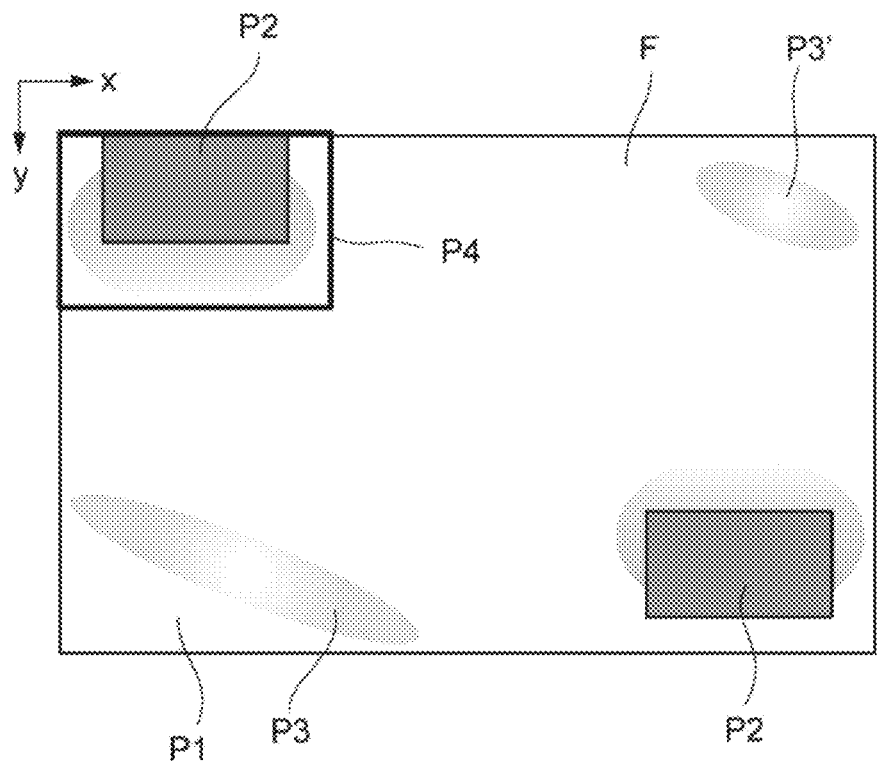

FIG. 9B shows the vibration map generated simultaneously with the mobility map generated by the MoMa moving on the floor F. As shown in FIG. 9B, the mobility map and the vibration map are not necessarily the same. First, environmental data E1 of the unmovable range P2 cannot be acquired, and thus there is no data about the unmovable range P2. Next, as the distances to the apparatuses M and M' decrease, the amount of vibration is observed in the vicinity of the apparatuses M and M' that are vibration sources. Also, the region P and a region P3 including its surrounding region and a region P' and a region P3' including its surrounding region are not the vibration sources, but they are insufficiently fixed to the floor surface, and thus are easily influenced by external vibrations. Thus, vibrations are observed in the regions P3 and P3'. That is, the regions P3 and P3' are movable regions, but large vibrations are observed and the MoMa easily falls over in these regions. Furthermore, these regions protrude from the floor surface, and thus the MoMa 10 more easily falls over in these regions.

Figure 10:
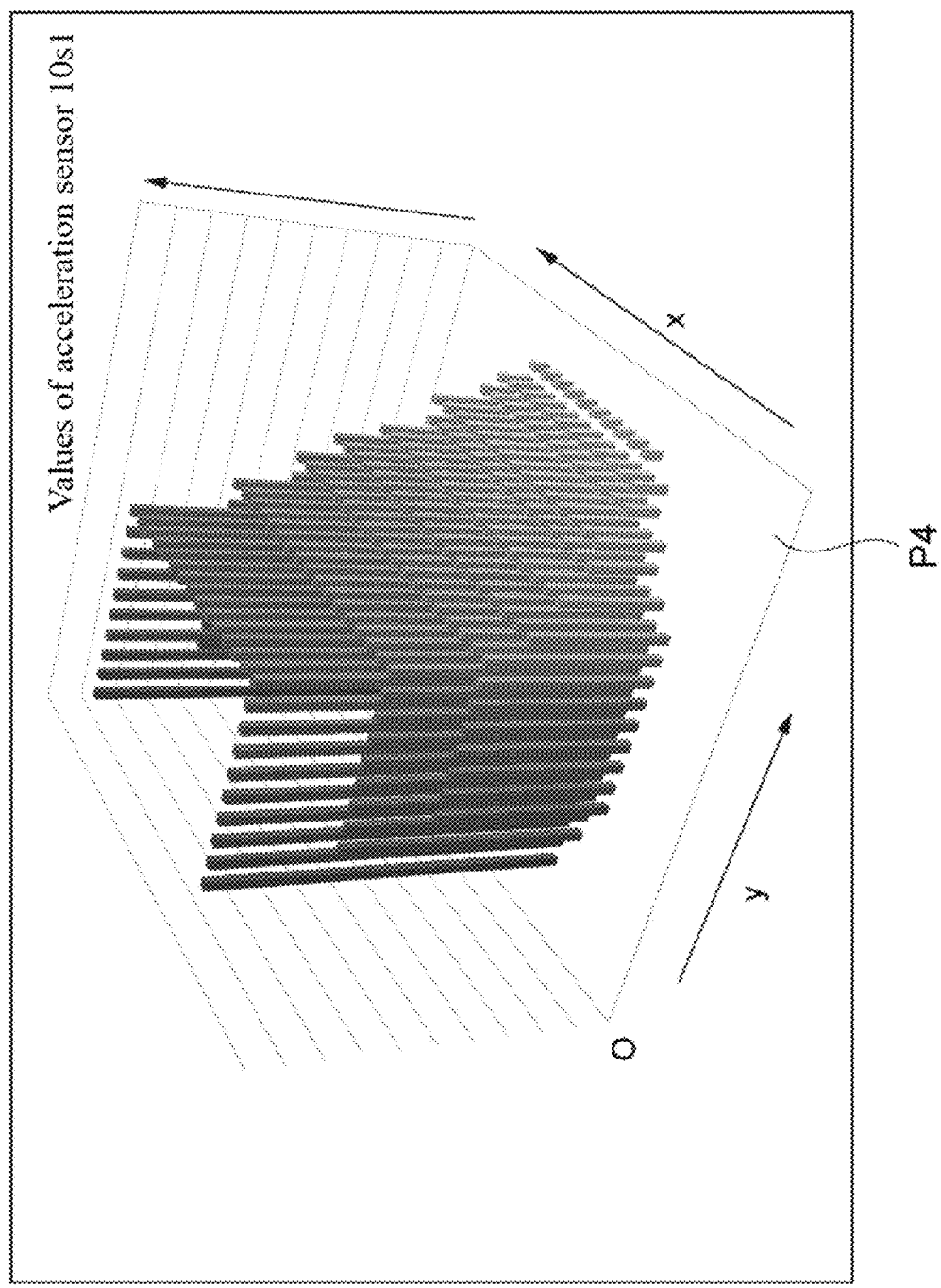
FIG. 10 is a perspective view illustrating a vibration map.

FIG. 10 is a perspective view of the vibration map in which the values of the acceleration sensor 10s1 are illustrated in a bar graph about a region P4 in FIG. 9B. The unit of the value of the acceleration sensor 10s1 is $(m/s^2)$. FIG. 10 shows that as the distance to the apparatus M decreases, the larger the vibrations are. Note that the size of each region (an example of the "section") where the amount of vibration is acquired can be selected as appropriate. Also, with regard to a region where it is known that vibrations are small, the section may be set to be large, and with regard to a region with a high possibility of falling over, the section may be set to be small.

Note that such a mobility map or a vibration map may also be generated using a plurality of MoMas 10 and 10', for example.

The MoMa 10 acquires the mobility map and the vibration map through pre-processing (step S70) described above. If the MoMa 10 generates these maps, a map can be read out from the HDD 10n in which these maps are recorded. If another MoMa 10' generates a map, a map can be received from an external server through the wireless antenna 10i, for example.

Subsequently, a position estimation unit F6 of the MoMa 10 estimates the position of the position estimation unit F6 by matching the output value obtained based on the LRF 10j and the mobility map. The mobility map is generated and the position of the estimation unit F6 is estimated as described above (block B1).

A control mode modification unit F9 then acquires the amount of vibration at a position at which the MoMa 10 is present at the future time t1 (step S71).

That is, the control mode modification unit F9 acquires the current estimation position of the MoMa 10. Also, because the moving path and the moving velocity of the MoMa 10 can be acquired, the position at the movement destination at the future time t1 can be calculated. The magnitude of a vibration at this position can be acquired with reference to the vibration map.

Next, it is determined whether or not the acquired magnitude of the vibration has at least a certain value (step S72), and if the magnitude of the vibration has a least the certain value, the control mode modification unit F9 changes the control mode to a low velocity mode, and reduces the velocity of the MoMa 10 by a certain amount (step S73). These steps S72 and S73 are similar to steps S42 and S43 that were described above, and thus their description will be omitted.

As described above, because the environmental data E1 is acquired in association with the position at the movement destination in advance, and the moving velocity of the MoMa 10 is determined based on the acquired environmental data E1 using a method for controlling the MoMa 10 according to an embodiment, it is possible to realize a control that is more adaptive to the environment and to suppress the risk of falling over or the like beforehand. As described above, depending on the environment, vibrations that can cause falling over may be sometimes generated in a region far from the vibration source, and thus adopting the MoMa 10 and a control method therefor according to an embodiment makes is possible to provide a MoMa that is more adaptive to the environment and a control method therefore.

Note that when an environment map is generated, values of a plurality of the acceleration sensors regarding the same point may also be acquired by making MoMa repeatedly pass through the same point, and the environment map may also be generated using an average value, a median, or the maximum value of these values.

The set of values of the acceleration sensors may also be smoothened using a method such as moving average. Smoothing in this manner makes it possible to estimate values of the acceleration sensor between moving points with high accuracy and to control the MoMa 10 based on the estimated values of the acceleration sensors with high accuracy.

Also, if the value of the acceleration sensor is not more than a predetermined value and can be regarded as not influencing falling over, this value may also be regarded as zero or ignored.

The vibration map may also be generated for types of MoMas to be moved, or types of workpieces or objects conveyed by a MoMa. Different MoMas have different masses, rigidities, and outer shapes, and thus have different amounts of vibrations. Similarly, also, the weight and shape of a workpiece to be conveyed may influence vibrations.

Similarly, a threshold for changing a control may also be changed in accordance with types of MoMa and the operation content.

Generation of the vibration map or the mobility map may also be realized using a plurality of MoMas through a communication network. A configuration may also be adopted in which these maps are stored in an external server and acquired at predetermined timing (for example, while a MoMa is charged) through the communication network.

Fourth Embodiment

Hereinafter, a fourth embodiment will be described. The description of the content that is the same as that of other embodiments will be omitted or simplified, and mainly the differences will be described.

In a method for controlling a MoMa 10 according to an embodiment, frequency analysis is performed on sections obtained by partitioning a floor F based on the above-described vibration map, and damping filters (an example of "environmental data") for suppressing vibrations in the sections are generated as environmental data E2 in association with the sections in advance. When the MoMa 10 is present in a section, a damping filter associated with this section is applied, when controlling the MoMa 10.

Figure 11:
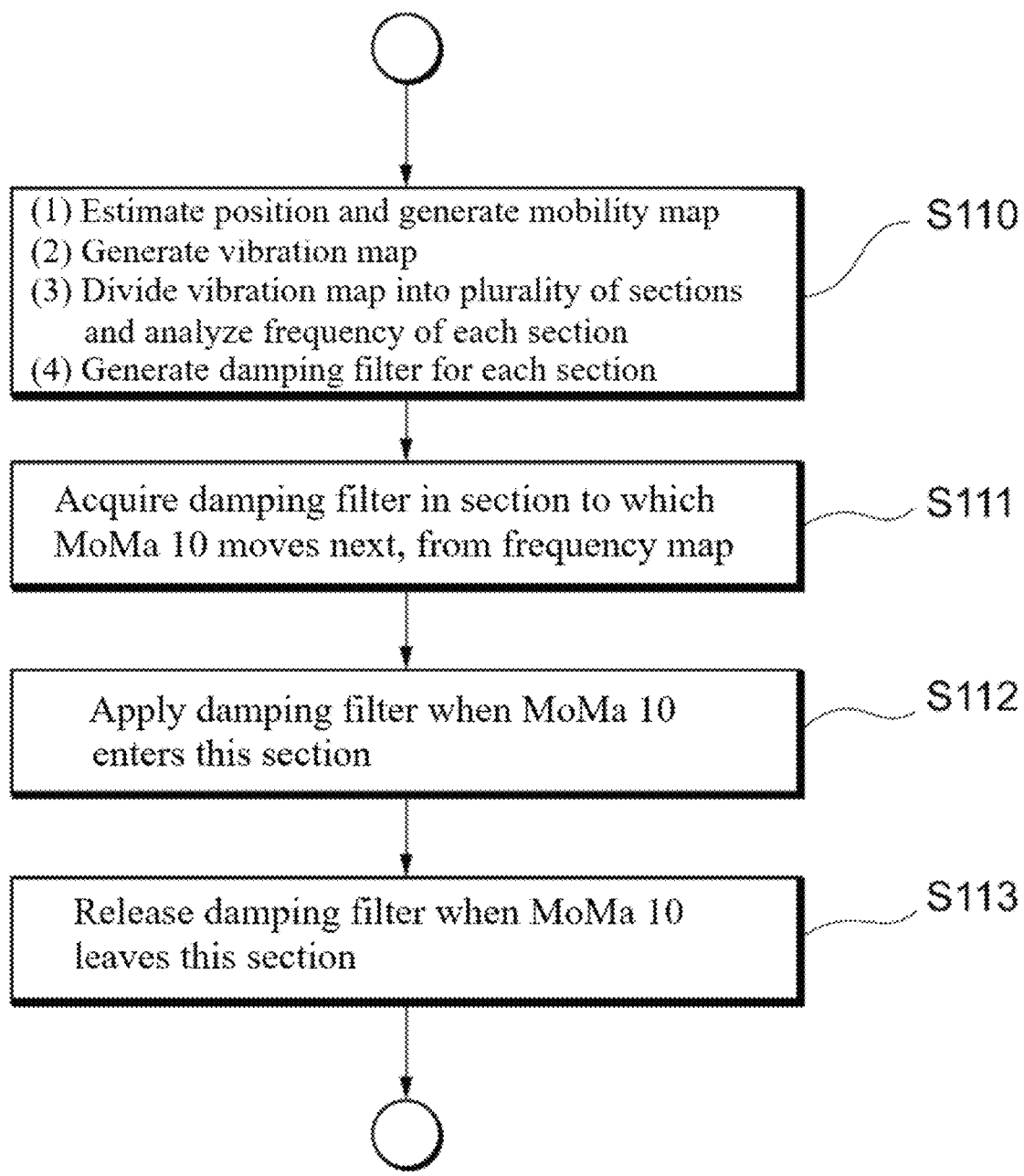
FIG. 11 is a flowchart illustrating a control method according to a fourth embodiment.
Figure 12:
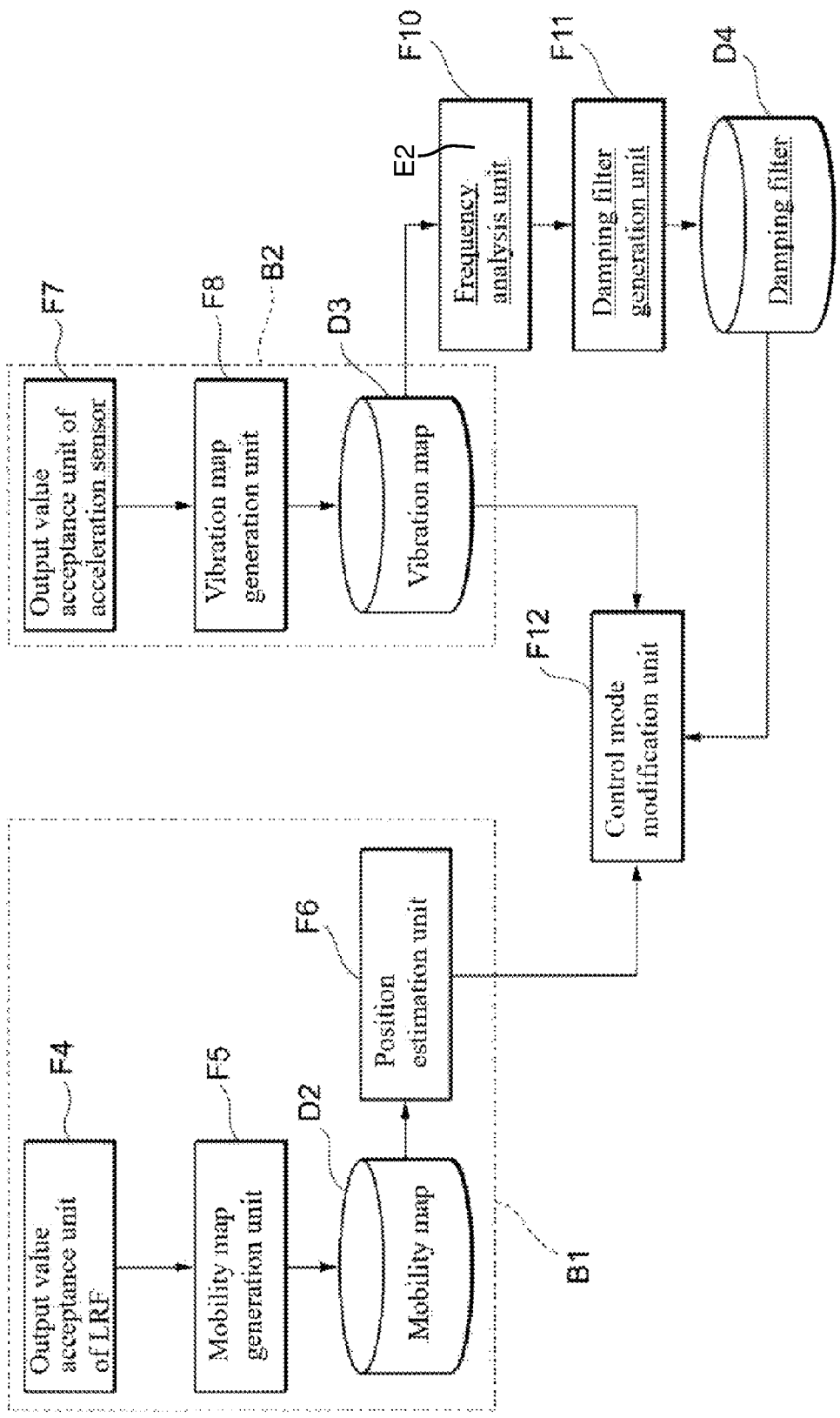
FIG. 12 is a diagram illustrating functional blocks for executing a control method according to a fourth embodiment.

FIG. 11 is a flowchart showing such a control method. FIG. 12 is a diagram of functional blocks for realizing such a control method. However, blocks B1 and B2 in FIG. 12 are similar to those in FIG. 8, and thus their description will be omitted.

First, pre-processing (step S110) will be described below.

However, in the pre-processing, (1) position estimation and mobility map creation and (2) vibration map generation are similar to those in step S70, and thus their description will be omitted.

Next, (3) the vibration map is divided into a plurality of sections (examples of "a plurality of points"). Automatic clustering may also be performed based on the vibration map or the vibration map may also be manually divided as a sectioning method.

(4) A damping filter is then generated for each section. Specifically, a frequency analysis unit F10 analyzes frequencies of the sections based on information indicating the amount of vibration that is obtained from the vibration map and is obtained by the acceleration sensors 10s1 that are located inside or outside the sections.

Figure 13A:
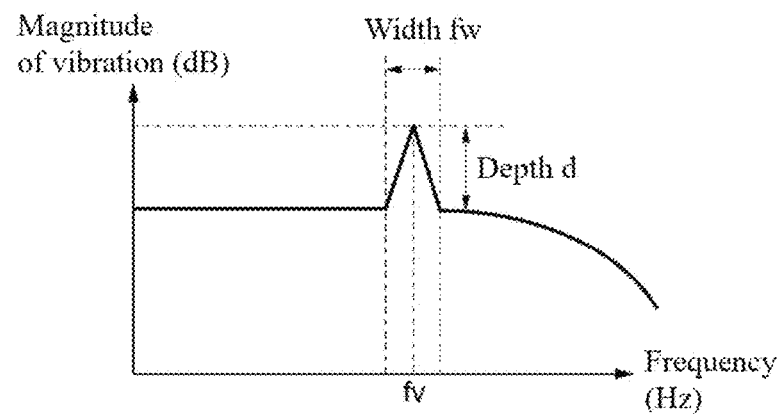
FIG. 13A to FIG. 13C are graphs illustrating a result of frequency analysis in a predetermined section.

FIG. 13A shows the result of frequency analysis in a given section. The horizontal axis represents the frequency (Hz), and the vertical axis represents values (dB) indicating the magnitude of a vibration obtained by subjecting the amount of vibration (m/s$^2$) obtained by the acceleration sensor 10s1 to frequency analysis.

In this diagram, it is understood that vibrations appear which have a resonance frequency fv (Hz) as the resonance frequency of a peak, a width of fw (Hz), and a depth of d (dB).

Figure 13B:
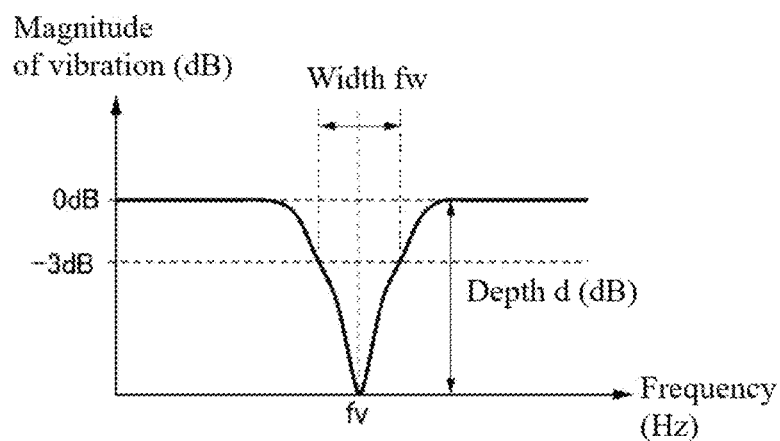

FIG. 13B shows a damping filter generated by the damping filter generation unit F11 based on the resonance frequency fv (Hz) of this vibration, its width, and its depth. The horizontal axis represents the frequency (Hz), and similarly to FIG. 13A, the vertical axis represents a value (dB) indicating the magnitude of the vibration.

As shown in this diagram, a damping filter (in FIG. 13B, a damping filter in which a frequency region with −3 dB with respect to the reference is regarded as fw, and its depth is regarded as d (dB)) for suppressing vibrations with a desired frequency) is generated for each section in advance.

Figure 13C:
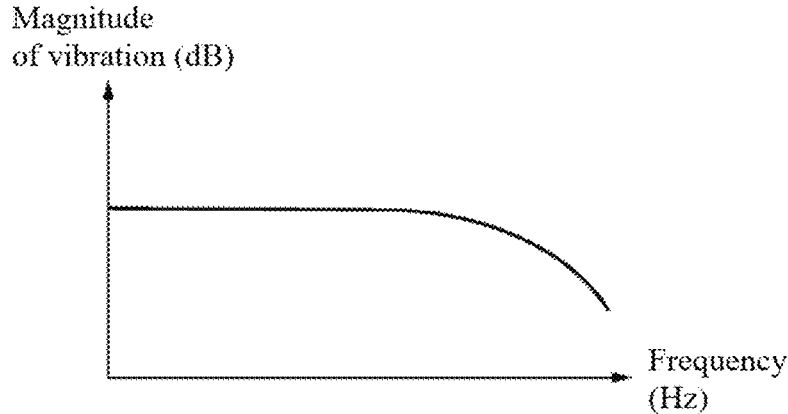

FIG. 13C is a graph showing the frequency (horizontal axis) and the magnitude of the vibration (vertical axis) when a control to which a damping filter is applied is performed. As shown in this diagram, resonance can be effectively suppressed by applying such a damping filter that suppresses the acquired resonance frequency and performing the control.

The damping filters associated with the sections are recorded in the HDD 10n as database D4, and pre-processing ends (step S110).

Next, steps of applying an optimal damping filter while the MoMa 10 moves (step S111 onward) will be described below.

First, the control mode modification unit F12 acquires a damping filter in a section to which the MoMa 10 moves next, from the database D4 based on the position that is estimated by the position estimation unit F6 (step S111).

The acquired damping filter is then applied when the MoMa 10 actually enters this section. Specifically, when acquiring the amount of vibration at the position estimated by the position estimation unit F6 from the vibration map D3, and generating control data for controlling the moving apparatus 10a or the robot arm 10r of the MoMa 10, the control mode modification unit F12 applies the damping filter, generates control data, and controls the moving apparatus 10a or the robot arm 10r (step S112).

Next, when the MoMa 10 leaves this section, the damping filter is released (step S113). If there is a damping filter that is to be applied to a new section, the control mode modification unit F12 applies this damping filter, and similarly, generates control data for controlling the moving apparatus 10a or the robot arm 10r of the MoMa 10, and controls the moving apparatus 10a or the robot arm 10r.

As described above, the MoMa 10 according to an embodiment generates, as environmental data, a damping filter corresponding to the frequency of the vibration at each position (section) on the floor F in advance, and while the MoMa 10 is entering this section, this damping filter is applied and the MoMa 10 is controlled, and thus it is possible to realize a control according to an environment at the movement destination.

In particular, if a task requires sophisticated operation using the robot arm 10*r*, the influence of vibrations needs to be reduced as much as possible. The MoMa 10 according to an embodiment is configured such that different damping filters are applied to the plurality of sections by providing each of the sections with a damping filter, and thus it is possible to control the MoMa 10 in a manner adaptive to each section. However, a configuration may also be adopted in which a damping filter adaptive to only some of the sections (sections where the MoMa 10 remains stationary and operates using a manipulator such as the robot arm 10*r*, for example) is applied to these sections.

Note that a configuration may also be adopted in which, instead of using the acceleration sensor 10*s*1, the servo motors 10*d'* of the robot arm 10*r* are each provided with a specific control signal, and frequency characteristics are acquired based on their feedback values. For example, while the MoMa 10 moves around on the floor F in order to generate a mobility map, the servo motors 10*d'* are each provided with a swept sin signal at a point with a possibility of a large amount of vibration, and a feedback value of the servo motor 10*d'* that is closest to the gripper G whose frequency characteristics are easily obtained can be acquired as the frequency characteristics (information as in FIG. 13A) at this position.

Environmental data stored in association with the positions of the vibration map may also be created for each time period. For example, if the operating status of the factory changes in accordance with a time period, creating a vibration map for each time period makes it possible to perform a control that is more adaptive to the environment in this time period. That is, if there are a time period (e.g., from 8:00 a.m. to 9:00 a.m.) during which apparatuses are not operating in the factory, a time period (e.g., from 9:00 a.m. to twelve o'clock) during which at least one of the apparatuses is operating in the factory, and a time period (e.g., from twelve o'clock to 15:00) during which all of the apparatuses are operating in the factory, creating a vibration map for each time period makes it possible to perform a control that is more adaptive to the environment at that time.

A configuration may also be adopted in which operating statuses of apparatuses that serve as vibration generation sources are acquired though a communication network and the vibration map (or environmental data associated with other position information) is updated in accordance with their operating statuses. For example, a vibration map when all of the apparatuses are operating is created in advance. The operating status of each apparatus (a state in which the power source of each apparatus is on or off) is acquired through the communication network, and the vibration map can be updated. A configuration may also be adopted in which, if information that the apparatus M is not operating is acquired, for example, the vibration map is updated where the amount of vibration around the apparatus M is regarded as zero, and the MoMa is controlled based on the updated vibration map.

Modification

The case will be described as a modification of the above-described embodiments where sound information of an environment (an example of "environmental data") is acquired as environmental data E4 using a sound collecting microphone 10*s*5 (an example of "environment acquisition sensor"), and frequency analysis is executed.

That is, because noise is generated due to vibrations, the sound collecting microphone 10*s*5 can be used instead of the acceleration sensor 10*s*1 for acquiring vibration information, or can be used in combination with the acceleration sensor 10*s*1.

Specifically, sound of the MoMa 10 at the current position is measured using the sound collecting microphone 10*s*5, and its frequency is analyzed using the frequency analysis unit F10.

A moving path is then selected such that a path that is close to a direction in which the MoMa 10 moves and has a small specific frequency component is selected.

Such a configuration makes it possible to realize a control according to an environment using a simple sound collecting microphone 10*s*5.

Also, it is possible to further eliminate influences of vibrations of the MoMa 10 by selectively acquiring sound emitted in the direction in which the MoMa 10 moves, using the sound collecting microphone 10*s*5 that is different from the acceleration sensor 10*s*1.

Note that a configuration may also be adopted in which a path with a small sound volume is selected without considering it frequency.

Fifth Embodiment

Hereinafter, a fifth embodiment will be described. The description of the content that is the same as that of other embodiments will be omitted or simplified, and mainly the differences will be described.

A MoMa 10 according to an embodiment is configured to acquire temperature information in association with positions, as environmental data E3. Such a configuration makes it possible to suppress malfunctions of a manipulator such as a robot arm 10*r* resulting from tasks with high load under a high-temperature environment and to extend the lifetime of the manipulator. For example, if a material is introduced into an apparatus generating high heat, such as a forging press apparatus, it is conceivable to use the MoMa 10, instead of a human operator. However, if tasks with high load are executed by the MoMa 10 at high temperature, abnormality and malfunctions of the MoMa easily occur. If abnormality occurs, there is a risk that the MoMa 10 will suddenly stop operating or cannot be controlled and will collide with other equipment, and a problem may arise such as personnel cost required to stop or restore the manufacturing line as a result of this sudden stop or collision. Furthermore, components of the MoMa 10, such as motors, encoders, and parts, will become too old for use.

On the other hand, when the same MoMa 10 moves or operates under a room-temperature environment, the MoMa 10 needs to efficiently move or operate based on normal standards.

In view of this, the MoMa 10 according to an embodiment acquires, using a temperature sensor 10*s*4, information on the temperatures of a plurality of positions in association with the positions.

Also, the MoMa 10 measures load factors of the servo motors 10*d* and 10*d'* using the servo drivers 10*e*.

If the temperature has at least a certain value and any one of the servo motors 10*d* and 10*d'* has at least a certain load factor, a controller 10*g* changes a command value for controlling the servo motors 10*d* or 10*d'*. For example, the controller 10*g* controls the servo motors 10*d* or 10*d'* such that the torque or electric current of the servo motors 10*d* or 10*d'* is reduced by a certain amount.

Subsequently, load factors of the servo motors 10d or 10d' are measured using the servo drivers 10e, and if the load factor is below a predetermined value as a result of the control above, the controller 10g controls the servo motors 10d or 10d' such that their torque or electric current return to the original value.

Such control makes it possible to execute tasks using a manipulator typified by the robot arm 10r while keeping the load factors of all of the servo motors 10d and 10d' at not more than predetermined values under a high-temperature environment.

Also, because tasks with high loads are permitted in a room-temperature environment as usual, efficiency is not impaired.

Because a configuration is adopted in which when the MoMa 10 operates or moves in a high-temperature and a room-temperature environment, the content of control changes in accordance with temperatures in this manner, a decrease in its lifetime resulting from tasks at a high temperature is suppressed, and it is possible to provide a MoMa 10 for which a time period during which the MoMa 10 is capable of operating in a robust manner is maintained.

Note that the MoMa 10 may also measure the load factors of the servo drivers 10e that supply electric current to the servo motors 10d and 10d', instead of measuring the load factors of the servo motors 10d and 10d', or in combination of measuring the load factors of the servo motors 10d and 10d'. Here, the load factor of the servo driver 10e includes load applied to an element for generating electric current to be supplied to the servo motor 10d or 10d' having at least a predetermined value. At this time, for example, if the load factor of at least one of the servo drivers 10e is at least a certain value, the controller 10g reduces a target value to be transmitted to the servo driver 10e by a certain amount. Because the servo driver 10e reduces the electric current to be supplied to the servo motor 10d or 10d' based on the target value that was reduced by a certain amount, the load factor of the servo driver 10e decreases.

Note that the configuration according to an embodiment can be combined with configurations according to other embodiments within the scope of ordinary creation by those skilled in the art. For example, a configuration may also be adopted in which information on a map storing information on temperatures that were acquired by the MoMa or the other MoMa in advance in association with positions is generated, and a control is performed in accordance with the generated map information.

Also, it is possible to control the MoMa 10 in combination with other environmental data (for example, a damping filter of this section).

Sixth Embodiment

Hereinafter, a sixth embodiment will be described. The description of the content that is the same as that of other embodiments will be omitted or simplified, and mainly the differences will be described.

A MoMa 10 according to an embodiment is characterized by changing the control content in accordance with illuminance (an example of "environmental data") of lighting at the movement destination.

That is, lightings typified by fluorescent lamps and LEDs are installed at predetermined intervals in manufacturing facilities such as factories. Thus, there are regions with insufficient illuminance depending on locations. There is a possibility that when the MoMa operates in such regions, the image recognition capability of a camera provided in the MoMa will decrease due to insufficient illuminance, and its object recognition performance, velocity, control performance, and operation accuracy will decrease, for example.

The MoMa 10 according to an embodiment has a configuration in which an image sensor (not shown) such as a CMOS image sensor is attached to a link at the leading end of the robot arm 10r, and the robot arm 10r is controlled using data on objects captured by this image sensor.

Also, this MoMa 10 includes an illuminance sensor 10s3, and thus is capable of acquiring information on the illuminance of a work environment.

Moreover, the MoMa 10 according to an embodiment is configured to change the mode for controlling the image sensor in accordance with the acquired illuminance.

Specifically, when the illuminance is low, a control is performed to lower its shutter speed below its standard, increase the gain of the image sensor, and open the diaphragm of its lens.

On the other hand, when the illuminance is high, a control is performed to increase the shutter speed above the standard, reduce the gain of the image sensor, and close the diaphragm of the lens.

Furthermore, information on the illuminance is stored in association with positions, and the MoMa 10 is controlled such that when the moving path is selected using a mobility map, a path with low illuminance is avoided and a path with high illuminance is selected as the moving path.

As described above, because the MoMa 10 according to an embodiment is configured to be controlled in accordance with the illuminance at the movement destination, the MoMa 10 is capable of accurately recognizing an object, and thus it is possible to perform a control that is more adaptive to the environment.

Modification

A modification of the MoMa 10 according to the above-described embodiments has a configuration in which the frequency of noise originating from lighting at the movement destination is acquired, a filter according to this frequency is applied to data obtained by an image sensor capturing an image, and image processing is performed.

For example, if the lighting is a fluorescent lamp or an LED, flickers occur at a predetermined frequency in some cases. As described above, a problem may arise under such an environment, such as a decrease in the image recognition capability of the image sensor.

In view of this, the MoMa 10 acquires and stores a reference image in advance under an ideal environment where causes of noise, such as flickers, are reduced.

The MoMa 10 then captures an image of its surroundings at the movement destination using the image sensor, obtains a difference between the reference image and the captured image, and thereby calculates a frequency component of the lighting.

The MoMa 10 then applies filtering to the image sensor, taking the calculated frequency component into consideration.

Because such a MoMa 10 is capable of dynamically eliminating noise depending on the lighting, it is possible to improve the image recognition capability of the MoMa 10.

Note that in this specification, "unit", "means", "procedure" do not simply mean physical configurations but also include the case where processing executed by the "unit" and the like is realized by software. Processing performed by one "unit" and the like, or one apparatus may also be executed by two or more physical configurations or apparatuses, or processing performed by two or more "units" and the like, or two or more apparatuses may also be executed by one physical means or apparatus. Also, the following embodiments are merely examples for illustrating the present invention, and it is not intended to limit the invention to only these embodiments.

Various modifications can be made to the present invention without departing from the gist thereof. For example, parts of constituent elements of a certain embodiment can be combined with another embodiment within an ordinary creative ability of those skilled in the art.

Part or all of the above-described embodiments will be described as the following additional remarks, but are not limited thereto.

Additional Remark 1

A mobile manipulator (10) including:
a moving apparatus (10a) for moving from a first position to a second position;
a manipulator (10r) that is connected to the moving apparatus (10a);
a controller (10g) configured to control the moving apparatus (10a) and the manipulator (10r); and
an environment acquisition sensor (10s) configured to acquire environmental data in association with a position of the moving apparatus (10a),
in which the controller (10g) controls at least one of the moving apparatus (10a) and the manipulator (10r) based on the environmental data that is acquired by the environment acquisition sensor, and is associated with the position at the movement destination or any point on a moving path between the first position and the second position.

Additional Remark 2

A control method for controlling a moving apparatus (10a) for moving from a first position to a second position, and a manipulator (10r) that is connected to the moving apparatus (10a), the control method including:
a step of acquiring environmental data in association with a position of the moving apparatus (10a) using an environment acquisition sensor (10s); and a step of controlling at least one of the moving apparatus (10a) and the manipulator (10r) based on the environmental data that is acquired by the environment acquisition sensor and is associated with the position at the movement destination or any point on a moving path between the first position and the second position.

Additional Remark 3

A program for causing a computer (10g) for controlling a moving apparatus (10a) for moving from a first position to a second position and a manipulator (10r) that is connected to the moving apparatus (10a) to execute:
a step of acquiring environmental data in association with a position of the moving apparatus (10a) using an environment acquisition sensor (10s); and
a step of controlling at least one of the moving apparatus (10a) and the manipulator (10r) based on the environmental data that is acquired by the environment acquisition sensor and is associated with the position at the movement destination or any point on a moving path between the first position and the second position.

The invention claimed is:

1. A mobile manipulator comprising:
a vehicle configured to move from a first position to a second position on a floor;
a manipulator connected to the vehicle;
a controller comprising a processor configured with a program to perform operations comprising controlling the vehicle and the manipulator;
an environment acquisition sensor configured to acquire environmental data comprising a frequency and an amplitude of a vibration from the floor; and
a storage configured to store the environmental data in association with a position of the vehicle,
wherein the controller controls the vehicle and the manipulator so as to reduce vibration to which the mobile manipulator is exposed based on pieces of the environmental data acquired by the environment acquisition sensor associated with the position of the vehicle, pieces of the environmental data associated with a movement destination of the vehicle, or pieces of the environmental data associated with any point on a moving path between the first position and the second position.

2. The mobile manipulator according to claim 1, wherein the vehicle moves on a plurality of points including the first position and the second position,
the environment acquisition sensor acquires the environmental data at ones of the plurality of points that are movement destinations, and
the processor of the controller is configured with the program to perform operations comprising controlling at least one of the vehicle and the manipulator based on the environmental data at each of the plurality of points.

3. The mobile manipulator according to claim 2, wherein the processor of the controller is configured with the program to perform operations comprising estimating a position of the vehicle,
the environment acquisition sensor acquires, and stores in the storage, the environmental data in each of a plurality of sections in a region where the manipulator is movable by the vehicle, and
the processor of the controller is configured with the program to perform operations comprising controlling at least one of the vehicle and the manipulator based on the environmental data corresponding to a section corresponding to the estimated position of the vehicle, wherein the vehicle and the manipulator are controlled in a different manner depending on the section.

4. The mobile manipulator according to claim 3, wherein the environment acquisition sensor acquires, as the environmental data, information related to the vibration in each of a plurality of sections in a region where the manipulator is movable by the vehicle, and
the processor of the controller is configured with the program to perform operations comprising controlling at least one of the vehicle and the manipulator based on the amplitude of the vibration corresponding to a section corresponding to the estimated position of the vehicle.

5. The mobile manipulator according to claim 3, wherein the environment acquisition sensor acquires, as the environmental data, information reflecting the frequency of the vibration in each of the plurality of sections in the movable region, and
the processor of the controller is configured with the program to perform operations comprising controlling the manipulator using a damping filter based on a section corresponding to an estimated position of the vehicle, and the frequency of the vibration in the section.

6. The mobile manipulator according to claim 2, wherein the environmental data comprises information related to the vibration, and
the processor of the controller is configured with the program to perform operations comprising controlling at least one of the vehicle and the manipulator based on the information related to the vibration.

7. The mobile manipulator according to claim 2,
wherein the environment acquisition sensor comprises an acceleration sensor for acquiring the amplitude and the frequency of the vibration at the movement destination as the environmental data,
the processor of the controller is configured with the program to perform operations comprising controlling the vehicle such that:
a moving velocity of the vehicle comprises a first velocity in a region including a point on the moving path where the amplitude of the vibration is at least a predetermined value, and
the moving velocity of the vehicle comprises a second velocity larger than the first velocity in a region including a point on the moving path where the amplitude of the vibration is less than the predetermined value.

8. The mobile manipulator according to claim 2,
wherein the environment acquisition sensor comprises an acceleration sensor for acquiring information related to the vibration at the movement destination as the environmental data,
the processor of the controller is configured with the program to perform operations comprising:
estimating, based on amplitudes of the vibration at a plurality of points, information related to the vibration at a next point, and
based on an estimated amplitude of the vibration being at least a predetermined value at the next point on the moving path, controlling the vehicle such that at least any one of a moving velocity at which the vehicle moves to the next point, a moving acceleration at which the vehicle moves to the next point, and a control gain of the vehicle that moves to the next point is not more than a predetermined value.

9. The mobile manipulator according to claim 1,
wherein the environmental data comprises information related to the vibration, and
the processor of the controller is configured with the program to perform operations comprising controlling at least one of the vehicle and the manipulator based on the information related to the vibration.

10. The mobile manipulator according to claim 9,
wherein the environment acquisition sensor acquires information related to the vibration at the movement destination as the environmental data,
the processor of the controller is configured with the program to perform operations comprising controlling the vehicle or the manipulator based on a first control mode or a second control mode for suppressing a vibration with a predetermined frequency compared with the first control mode, and is configured to select the first control mode or the second control mode based on the information related to the vibration.

11. The mobile manipulator according to claim 1,
wherein the environment acquisition sensor comprises an acceleration sensor for acquiring the amplitude and the frequency of the vibration at the movement destination as the environmental data;
the processor of the controller is configured with the program to perform operations comprising controlling the vehicle such that:
a moving velocity of the vehicle comprises a first velocity in a region including a point on the moving path where the amplitude of the vibration is at least a predetermined value, and
the moving velocity of the vehicle comprises a second velocity larger than the first velocity in a region including a point on the moving path where the amplitude of the vibration is less than the predetermined value.

12. The mobile manipulator according to claim 1,
wherein the environment acquisition sensor comprises an acceleration sensor for acquiring information related to the vibration at the movement destination as the environmental data,
the processor of the controller is configured with the program to perform operations comprising:
estimating, based on amplitudes of the vibration at a plurality of points, information related to the vibration at a next point on the moving path, and
based on an estimated amplitude of the vibration being at least a predetermined value at the next point on the moving path, controlling the vehicle such that at least any one of a moving velocity at which the vehicle moves to the next point, a moving acceleration at which the vehicle moves to the next point, and a control gain of the vehicle that moves to the next point is not more than a predetermined value.

13. The mobile manipulator according to claim 1,
wherein the environmental data comprises data measured by an environment acquisition sensor of another mobile manipulator.

14. The mobile manipulator according to claim 1,
wherein the manipulator comprises a multi-articulated robot arm comprising a plurality of servo motors and a plurality of links that are driven by the plurality of servo motors, and
the environment acquisition sensor acquires, as the environmental data, a frequency of the vibration at a point on the moving path based on a response received when a signal including a frequency in a predetermined band is input to at least one of the servo motors.

15. The mobile manipulator according to claim 1,
wherein the environment acquisition sensor acquires a temperature at the movement destination as the environmental data,
the manipulator comprises a multi-articulated robot arm comprising a plurality of servo motors and a plurality of links that are driven by the plurality of servo motors,
the processor of the controller is configured with the program to perform operations comprising, in response to the temperature having at least a predetermined value, and at least one of the servo motors having at least a predetermined load factor, a load factor of the servo motor being calculated based on electric current to a servo driver configured to supply the electric current to the servo motor, lowering a command value for the servo motor such that the load factor of the servo motor is not more than a predetermined value.

16. The mobile manipulator according to claim 1, comprising:
an image capture sensor for capturing an image of a surrounding environment,
wherein the environment acquisition sensor acquires, as the environmental data, information on illuminance originating from a lighting environment at the movement destination, and
the processor of the controller is configured with the program to perform operations comprising controlling the moving path on which the manipulator is moved by the vehicle based on the illuminance information.

17. A control method for controlling a mobile manipulator comprising a vehicle configured to move from a first position to a second position on a floor, and a manipulator connected to the vehicle, the control method comprising:
  acquiring environmental data comprising a frequency and an amplitude of a vibration from the floor;
  storing the environmental data in association with a position of the vehicle; and
  controlling the vehicle and the manipulator so as to reduce vibration to which the mobile manipulator is exposed based on pieces of the environmental data associated with the position of the vehicle, pieces of the environmental data associated with the position at a movement destination, or pieces of the environmental data associated with any point on a moving path between the first position and the second position.

18. A non-transitory computer-readable storage medium storing a program for causing a computer for controlling a mobile manipulator comprising a vehicle configured to move from a first position to a second position on a floor, and a manipulator connected to the vehicle, to perform operations comprising:
  acquiring environmental data comprising a frequency and an amplitude of a vibration from the floor;
  storing the environmental data in association with a position of the vehicle; and
  controlling the vehicle and the manipulator so as to reduce vibration to which the mobile manipulator is exposed based on pieces of the environmental data associated with the position of the vehicle, pieces of the environmental data associated with the position at a movement destination, or pieces of the environmental data associated with any point on a moving path between the first position and the second position.

* * * * *